US008694357B2

(12) United States Patent
Ting et al.

(10) Patent No.: US 8,694,357 B2
(45) Date of Patent: Apr. 8, 2014

(54) ONLINE MARKETING RESEARCH UTILIZING SENTIMENT ANALYSIS AND TUNABLE DEMOGRAPHICS ANALYSIS

(75) Inventors: Tessie C. Ting, Markham (CA); Jean Davis, Centerport, NY (US); Frances Annie Pettit, Toronto (CA)

(73) Assignee: e-Rewards, Inc., Plano, TX (US)

( * ) Notice: Subject to any disclaimer, the term of this patent is extended or adjusted under 35 U.S.C. 154(b) by 520 days.

(21) Appl. No.: 12/802,445

(22) Filed: Jun. 7, 2010

(65) Prior Publication Data

US 2011/0004483 A1    Jan. 6, 2011

Related U.S. Application Data

(60) Provisional application No. 61/185,073, filed on Jun. 8, 2009.

(51) Int. Cl.
*G06Q 10/00*    (2012.01)

(52) U.S. Cl.
USPC .......................................... 705/7.29; 705/7.32

(58) Field of Classification Search
USPC ................................................ 705/7.29, 7.32
See application file for complete search history.

(56) References Cited

U.S. PATENT DOCUMENTS

| 6,535,819 | B1 * | 3/2003 | Clark ............................... 702/19 |
| 7,058,590 | B2 * | 6/2006 | Shan ............................ 705/7.29 |
| 7,246,035 | B1 * | 7/2007 | Palit .............................. 702/179 |
| 7,302,475 | B2 * | 11/2007 | Gold et al. .................... 709/217 |
| 7,406,436 | B1 | 7/2008 | Reisman |
| 7,533,084 | B2 * | 5/2009 | Holloway et al. ..................... 1/1 |
| 7,596,552 | B2 * | 9/2009 | Levy et al. ............................ 1/1 |
| 7,689,624 | B2 * | 3/2010 | Huang et al. .................. 707/760 |
| 7,698,163 | B2 * | 4/2010 | Reed et al. .................... 705/7.33 |
| 7,698,422 | B2 * | 4/2010 | Vanderhook et al. ......... 709/224 |
| 7,788,086 | B2 * | 8/2010 | Corston-Oliver et al. ........ 704/9 |
| 7,860,741 | B1 * | 12/2010 | Robinson ..................... 705/7.31 |
| 7,890,451 | B2 * | 2/2011 | Cancel et al. ................. 707/607 |
| 7,912,898 | B2 * | 3/2011 | Gold et al. .................... 709/203 |
| 7,949,561 | B2 * | 5/2011 | Briggs ........................ 705/14.41 |
| 7,979,544 | B2 * | 7/2011 | Cancel et al. ................. 709/224 |
| 7,996,210 | B2 * | 8/2011 | Godbole et al. .................. 704/9 |
| 8,073,807 | B1 * | 12/2011 | Srinivasaiah .................. 706/62 |
| 8,090,613 | B2 * | 1/2012 | Kalb et al. .................... 705/7.29 |

(Continued)

FOREIGN PATENT DOCUMENTS

WO    WO 2005/116898 A2    12/2005

OTHER PUBLICATIONS

Liu, Bing, Opinion Mining & Summarization—Sentiment Analysis WWW-2008, Apr. 21, 2008.*

(Continued)

*Primary Examiner* — Scott L Jarrett
(74) *Attorney, Agent, or Firm* — Filbright & Jaworski LLP

(57) ABSTRACT

An online marketing research system where users identify a specific brand and/or competitive brands in which they are interested. An internet crawler engine collects sentiments relating to the identified brands according to a sampling method, which may be created by the user. The results from the internet crawler are refined using a refinement engine. The refined sentiments are then scored by a sentiment engine. Users may view the scored results via a user interface, which itself includes an interactive sentiment modeler. The interactive sentiment modeler provides quantified insights and allows users to select types of charts, the constructs, and timelines that are important to them.

55 Claims, 17 Drawing Sheets

(56) References Cited

U.S. PATENT DOCUMENTS

| | | | |
|---|---|---|---|
| 8,135,669 B2* | 3/2012 | Olstad et al. | 707/608 |
| 2001/0034686 A1* | 10/2001 | Eder | 705/36 |
| 2002/0111954 A1* | 8/2002 | McCoy | 707/104.1 |
| 2003/0195793 A1 | 10/2003 | Jain et al. | |
| 2004/0103051 A1* | 5/2004 | Reed et al. | 705/36 |
| 2004/0236623 A1* | 11/2004 | Gopalakrishnan | 705/10 |
| 2005/0165634 A1 | 7/2005 | Rimsky | |
| 2006/0085255 A1* | 4/2006 | Hastings et al. | 705/14 |
| 2006/0155513 A1* | 7/2006 | Mizrahi et al. | 702/179 |
| 2006/0235966 A1* | 10/2006 | Rossow et al. | 709/224 |
| 2007/0033188 A1* | 2/2007 | Levy et al. | 707/7 |
| 2007/0038607 A1* | 2/2007 | Herman et al. | 707/3 |
| 2007/0112735 A1* | 5/2007 | Holloway et al. | 707/3 |
| 2007/0218834 A1* | 9/2007 | Yogev et al. | 455/2.01 |
| 2007/0294126 A1* | 12/2007 | Maggio | 705/10 |
| 2008/0021763 A1* | 1/2008 | Merchant | 705/10 |
| 2008/0091510 A1* | 4/2008 | Crandall et al. | 705/10 |
| 2008/0270218 A1* | 10/2008 | Scott et al. | 705/10 |
| 2009/0012839 A1* | 1/2009 | Fusillo et al. | 705/10 |
| 2009/0048823 A1* | 2/2009 | Liu et al. | 704/9 |
| 2009/0112892 A1* | 4/2009 | Cardie et al. | 707/100 |
| 2009/0119156 A1* | 5/2009 | Dulepet | 705/10 |
| 2009/0119157 A1* | 5/2009 | Dulepet | 705/10 |
| 2009/0216524 A1* | 8/2009 | Skubacz et al. | 704/9 |
| 2009/0222329 A1* | 9/2009 | Ramer et al. | 705/10 |
| 2009/0228338 A1* | 9/2009 | Brandman et al. | 705/10 |
| 2009/0306967 A1* | 12/2009 | Nicolov et al. | 704/9 |
| 2009/0319518 A1* | 12/2009 | Koudas et al. | 707/5 |
| 2010/0017286 A1* | 1/2010 | Coles et al. | 705/14.43 |
| 2010/0313218 A1* | 12/2010 | Niemeijer et al. | 725/35 |

OTHER PUBLICATIONS

Pang, Bo et al., Opinion mining and sentiment analysis Foundings and Trends in Information Retrieval, vol. 2, No. 1-2, 2008.*

Dave, Kushal et al., Mining the Peanut Gallery: Opinion Extraction and Semantic Classification of Product Reviews WWW2000, May 20-24, 2003, ACM.*

Godbole, Namrata et al., Large-Scale Sentiment Analysis for News and Blogs ICWSM'2007, 2007.*

Malgarini, Marco, Efficient sample design and weight methodologies—Analysis of key issues and recommendations OECD Workshop on International Development of Business and Consumer Tendency Surveys, Nov. 2005.*

Raghavan, Preeti B., Extracting Opinions from Blog Comments: Analysis, Design and Applications The Ohio State University, 2009.*

MRSI Introduces mrExpress Online Research Service—Research Results in 24 Hours at a Fractino of the Cost of Traditional Custom Research, PRWeb, Oct. 17, 2008.*

Marketing Research and Information Systems, Chapter 7: Sampling in Marketing Research FAO Corporate Document Respository, Retrieved Apr. 25, 2012.*

Sentiment Analysis—definition Wikipedia.org, Retrieved Apr. 25, 2012.*

Sampling Fraction—definition Wikipedia.org, Retreived Apr. 25, 2012.*

Quota Sampling—definition Wikipedia.org, Retrieved Apr. 25, 2012.*

Stratified Sampling—definition Wikipedia.org, Retrieved Apr. 25, 2012.*

Astroturfing—definition Wikipedia.org, Retrieved Apr. 25, 2012.*

Daniel, Johnnie, Sampling Essentials: Chapter 5—Choosing the Type of Probability Sampling Sage Publications, 2011.*

Stratified Random Sampling, Chapter 11 Date Unknown, Retrieved Apr. 25, 2012.*

Stratification and Stratified Random Sampling Date Unkown, Retrieved Apr. 25, 2012.*

Notification of Transmittal of the International Search Report and the Written Opinion of the International Searching Authority, or the Declaration from International Application No. PCT/US2010/037640, Date Mailed: Jan. 20, 2011, 9 pages.

* cited by examiner

DEMOGRAPHIC SAMPLE BOOST

| DEMOGRAPHIC DESCRIPTION OF SOURCE | AGE (YOUNG 18-45) | GENDER (MALE) | INCOME (LOW, 0k TO 49k) | EDUCATION (LOW, NONE TO HIGH SCHOOL) | DEFAULT WEIGHT | DEFAULT TARGET |
|---|---|---|---|---|---|---|
| SOURCE A | 78% | 68% | 60% | 82% | 100% | 25% |
| SOURCE B | 45% | 48% | 85% | 60% | 100% | 25% |
| SOURCE C | 51% | 55% | 28% | 55% | 100% | 25% |
| SOURCE D | 21% | 18% | 30% | 26% | 100% | 25% |
| AVERAGE FOR DEMO | 49% | 47% | 51% | 56% | | |

| REQUIREMENT | BOOST YOUNG | MAINTAIN | BOOST HIGH | MAINTAIN | | |
|---|---|---|---|---|---|---|

| REWEIGHT INDIVIDUAL SOURCES | AGE | GENDER | INCOME | EDUCATION | OVERALL WEIGHTS | NEW TARGET |
|---|---|---|---|---|---|---|
| SOURCE A | 160% | 100% | 81% | 100% | 110% | 28% |
| SOURCE B | 92% | 100% | 30% | 100% | 81% | 20% |
| SOURCE C | 105% | 100% | 146% | 100% | 113% | 28% |
| SOURCE D | 43% | 100% | 142% | 100% | 96% | 24% |

FIG. 7

| CATEGORY | CONSTRUCT | DEFINITION |
|---|---|---|
| SUMMARY MEASURES | | |
| E CUBED | | A MATHEMATICAL SUMMARY OF THE OVERALL EQUITY OF BRAND USING EVOLISTEN SENTIMENT AND SHARE SCORES |
| KEY SUMMARY | | A MATHEMATICAL SUMMARY OF THE OVERALL KEY MEASURES USING EVOLISTEN SENTIMENT SCORES |
| MIX SUMMARY | | A MATHEMATICAL SUMMARY OF THE OVERALL MARKETING MIX VARIABLES USING EVOLISTEN SENTIMENT SCORES |
| SHARE OF VOICE | | PERCENTAGE OF TOTAL CRAWLS THAT RELATE TO A SPECIFIC BRAND DIVIDED BY THE AVERAGE PERCENTAGE OF TOTAL CRAWLS RELATED TO SEPARATE BRANDS |
| INDIVIDUAL MEASURES THAT FOLLOW | CONSTRUCT BELOW | AVERAGE SENTIMENT SCORES FOR SENTIMENTS THAT USE WORDS RELATING TO THE FEEL OF A PRODUCT. SELECTED UNIQUE SEARCH WORDS INCLUDE: |
| SENSE | | |
| | FEEL | FEEL, SMOOTH, SOFT, ROUGH |
| | SOUNDS | SOUNDS, LISTEN, HEAR |
| | TASTES | TASTE, BITTER, SALTY |
| | LOOKS | LOOKING, SEE, VIEW |
| | SMELLS | SMELL, SCENT, ODOUR, ODOR, REEK, STINK |
| KEY | | |
| | RECOMMEND | RECOMMEND, ADVOCATE, COMMEND |
| | NEW | NEW, DIFFERENT, DEBUT |
| | BELIEVE | CERTAIN, CONFIDENT, POSITIVE |
| | PURCHASE INTENT | BUY, INVEST, PURCHASE |
| | VALUE | APPRAISEL, WORTH |
| | AWARENESS | HEARD OF, KNOW OF, FAMILIAR WITH |
| | TRIAL | TRY, TRIED |
| EMOTION | | |
| | HAPPY | AMUSE, AWESOME, CHEER |
| | FEAR | AFRAID, ANXIETY, AVERS |
| | SURPRISE | AMAZE, ABRUPT, BOMBSHELL |
| | SAD | BEREAVED, BITTER, CALAMITY |
| | DISGUST | ABHOR, SUCKS, BITES |
| | ANGER | MUD, HUFF, ACERBATE |
| | ANTICIPATION | ASSUME, AWAIT, CONJECTURE |
| MARKETING | | |
| | PLACEMENT | STORE, TARGET, VENDING MACHINE |
| | PRODUCT | DESIGN, BEST, FIX |
| | PRICE | PRICE, BILL, FEE |
| | PROMOTION | TV, ADVERTISE, COMMERCIAL |

FIG. 9A

| | | |
|---|---|---|
| PLACEMENT | | |
| | GROCERY | CUB FOODS, IGA, STEINMART |
| | ELECTRONICS | FUTURE SHOP |
| | DRUG | DRUG, PHARMACY |
| | DEPARTMENT | BLOOMINGDALES, MACY'S |
| | DISCOUNT | WALMART, TARGET |
| ATTRIBUTES | | |
| | SPEED | SPEED, ACCELERATE, CREEP |
| | WEIGHT | WEIGHT, AIRY, BEEFY |
| | SIZE | SIZE, AMPLE, BIG |
| | COLOR | COLOR, COLOUR, BLUE |
| | SHAPE | CIRCLE, CONE, ELLIPSE |
| | TIME | TIME, CLOCK, CURRENT |
| | MESSY | MESSY, DIRTY, CLEAN |
| | ALLERGIC | SENSITIVE, ALLERGY |
| DEMOS | | |
| | AGE | AGE, OLD, ADULT |
| | SEX | GENDER, SEX, MALE |
| | INCOME | INCOME, BANKRUPT, BEGGAR |
| | EDUCATION | EDUCATION, SCHOOL, COLLEGE |
| | RACE | RACE, AFRICAN, ASIAN |
| | LANGUAGE | LANGUAGE, ACCENT, BROGUE |
| | RELIGION | RELIGION, AGNOSTIC, ATHEIST |
| | REGION | REGION, CITY, BOONDOCKS |
| THE W's | | |
| | WHO | WHO |
| | WHAT | WHAT |
| | WHEN | WHEN |
| | WHERE | WHERE |
| | WHY | WHY |
| | HOW | HOW |
| APPAREL | | |
| | TOPS | TOPS, BLOUSE, CHEMISE |
| | BOTTOMS | BOTTOMS, SLACKS, JEANS |
| | UNDERWEAR | UNDERWEAR, PANTIES, BOXERS |
| | ACCESSORY | BELT, SCARF, SHOE |
| | JEWELRY | JEWELRY, ANKLET, BAUBLE |
| | FABRIC | FABRIC, RAYON, ACETATE |
| MAKEUP | | |
| | EYE | EYE, SHADOW, LINER |
| | LIP | LIP, STICK, GLOSS |
| | FACE | BLUSH, FOUNDATION, POWDER |
| | NAILPOLISH | NAIL, POLISH, MANICURE |

FIG. 9B

| COUNTRIES | | |
|---|---|---|
| | AMERICA | USA, AMERICA, ALABAMA |
| | SOUTH AMERICA | SOUTH AMERICA, BOLIVIA, CHILE |
| | CANADA | CANADA, ALBERTA, MANITOBA |
| | EUROPE | EUROPE, BELGIUM, DENMARK |
| | ASIA | ASIA, CHINA, HONG KONG |
| | AFRICA | AFRICA, CONGO, GHANA |
| | MIDDLE-EAST | MIDDLE-EAST, ARMENIA, EGYPT |
| | PACIFIC | PACIFIC RIM, AUSTRALIA |
| UNCLASSIFIED | | |
| | GENERIC | STORE BRAND, NO NAME, KNOCK OFF |
| | MISTAKE | MISTAKE, DELUSION, BLOOPER |
| | FAVOURITE | FAVOURITE, POPULAR |
| | ADDITIVE | IMITATION, ARTIFICIAL, COUNTERFEIT |

FIG. 9C

ONLINE MARKETING RESEARCH UTILIZING SENTIMENT ANALYSIS AND TUNABLE DEMOGRAPHICS ANALYSIS

RELATED APPLICATION

This application claims the benefit of U.S. Provisional Application No. 61/185,073, filed on Jun. 8, 2009. The entire teachings of the above application are incorporated herein by reference.

BACKGROUND

When online surveys first became a viable product in the late 1990's, they were new and exciting for consumers. Even though the surveys were laid out in a very plain, text-heavy format, people enjoyed answering them; they answered them carefully and honestly, and they could be counted on to complete most of the surveys that were sent to them. Even better, consumers responded with minimal, if any, incentives.

The success of online surveys, brought about by the decreased cost and increased speed associated with them, led to a saturation in the marketplace, with each supplier vying for the attention of the same survey responders. This saturation led to some differentiation in the marketplace whereby some suppliers offered more valuable incentive's, others offered more engaging and user friendly surveys, and still others simply failed to keep up with the times and continued to provide 'old style' surveys.

The consequences of this were not advantageous to the marketing research industry. Survey responders, weary of the glut in the marketplace, now choose which surveys they will answer based on the incentive offered or style of survey. Those who desire cash or prizes seek out those suppliers. Those who desire engaging surveys seek out those suppliers. Significantly, many have given up on surveys because the marketing research industry failed to meet their needs for incentives and providing engaging surveys. Survey return rates have declined drastically over the last few years and conferences have sprung up in the attempt to find solutions to the low return rates.

Marketing research businesses often employ specific standardized processes for seeking out, compiling, analyzing, and presenting data. Marketing research typically follows a set series of processes for determining from where data can be collected and from where it will actually be collected. Common quantitative methods for compiling data include surveys, whether online or offline, structured interviews, and physical or technical measurements. Common qualitative methods for compiling data include participant observation, unstructured interviews, and focus groups. Both qualitative and quantitative research then uses various processes for analyzing data, which may be simple descriptive statistics such as frequency distributions or means but may also be more complicated statistics such as regression and conjoint analysis. Again, in both qualitative and quantitative cases, after completing any analyses, summaries and conclusions are prepared to explain the research findings. The desired conclusion of these studies, regardless of the methods and processes used, is to usually identify how consumers feel about specific products, whether they like the products, whether they plan to buy more of them, whether they like the taste or look or feel or the product, and various other attributes that will assist the business in better meeting the needs of the consumer.

Over the last few years, new online survey research approaches have been implemented. The internet is a constantly expanding database containing vast quantities of information about any conceivable topic. Consumer focused businesses have websites that share information about their products and services. With the advent of web 2.0, those websites now include user forums or message boards that allow consumers to ask questions, offer praise or critiques, or simply post their personal opinions about the business and their products. Individuals also share information via their own personal webpages. Sites such as Facebook, Twitter, Wordpress, YouTube, and Flickr allow individuals to share information with friends, family, colleagues and strangers. This information is usually of a personal nature, but may include product and services information as well.

The internet has essentially become a product database containing all possible points of view about every person, product, service, and brand that exists. Today, marketing researchers are taking advantage of this readily available information, and analyzing and packaging it in a format usable to brands.

Website analytics techniques are often used to monitor online traffic. Website analytics techniques typically monitor websites in terms of how many visitors they receive, how often those visitors happen to arrive there, where those visitors came from and where they are going, what search terms brought them to the site, and how long they stay on the site. These sites inform business about their website's popularity in comparison to their immediate competitors, and in comparison to the internet in general. They may also monitor specific brands over the internet in terms of number of mentions, comments, and replies. Website analytics services can be used to inform clients about whether there is a lot of chatter and commotion related to their products. Usually, the end goal is to gather already existing internet data and summarize it so that clients know where and how many people are talking about their products.

SUMMARY

One of the main problems with the existing marketing research and the website analytics techniques is that they have yet to effectively overlap. Though marketing research companies have figured out how to monitor and quantify brand satisfaction and other important measures, they have yet to apply this knowledge to the freely available information on the internet. And, while numerous website analytics companies have figured out how to quantify certain aspects of the online data they are collecting, they have yet to figure out how to quantify the key measures within marketing research, as well sampling, categorization, and importantly, actionability.

Thus, it has become clear that the existing survey research methods should be supplemented with new methods of gathering consumer data. While surveys are still a viable means of data collection, appropriate parallel research techniques can be used to supplement the data.

Preferred embodiments of the present invention incorporate data collection techniques from multiple sources. The first type of data collection can be marketing research employing processes for seeking out, compiling, analyzing, and presenting data. Marketing research typically follows a set series of processes for determining from where data can be collected and from where it will actually be collected. Common quantitative methods for compiling data include surveys, whether online or offline, structured interviews, and physical or technical measurements. Common qualitative methods for compiling data include participant observation, unstructured interviews, and focus groups. Both qualitative and quantitative research then uses various processes for analyzing data, which may be simple descriptive statistics such as frequency distributions or means but may also be more complicated statistics such as regression and conjoint analysis. Again, in both qualitative and quantitative cases, after completing any analyses, summaries and conclusions are prepared to explain the research findings. The desired conclusion of these studies, regardless of the methods and processes used, is to identify how consumers feel about specific products, whether they like the products, whether they plan to buy more of them, whether they like the taste or look or feel or the product, and various other attributes that will assist the business in better meeting the needs of the consumer.

Another type of data collection that is preferably used by the present invention is website analytics data collection. Website analytics techniques typically monitors websites in terms of how many visitors they receive, how often those visitors happen to arrive there, where those visitors came from and where they are going, what search terms brought them to the site, and how long they stay on the site. These sites inform business about their website's popularity in comparison to their immediate competitors, and in comparison to the internet in general. They may also monitor mentions of the clients brand over the internet in terms of number of mentions, comments, and replies. Website analytics services typically inform clients about whether there is a lot of chatter and commotion related to their products. The end goal is to gather already existing internet data and summarize it so that clients know where and how many people are talking about their products.

The invention may be implemented in a data processing system, which executes a sampling engine. The sampling engine may perform stratified random sampling. A demographic boosting system may be used to target categories of internet websites from the internet sampling frame. A matrix may be selected and used to target categories of internet websites from the internet sampling frame. The matrix may be used to tune the demographic boosting system and thus create the target categories of internet websites from which relevant internet data should be gathered. A search engine, in communication with the demographic boosting system, can be used to process the internet sampling frame to identify and crawl internet website sentiments that are responsive to the target categories defined by the demographic boosting system. A construct engine can be used to store the internet website sentiments into taxonomic units of data.

The taxonomic units of data can be used to create constructs. The constructs can be processed to provide average sentiment scores for the sentiments using words relating to a product. The construct engine can score the sentiments based on a computation process that integrates measures, for example, a marketing mix of measures including price, product, placement, and promotion associated with the product.

The user can tune the demographics boosting system by modifying its parameters. For instance, modifiable parameters that are used to tune the demographics boosting system can include: a list of potential internet websites to be crawled; a default target percentage of sentiments to be crawled for each potential internet website; and a specified percentage of a demographic variable for each of the potential internet websites. The demographic variable associated with each of the potential websites can include: a male variable defining a percentage of the potential internet websites to be crawled that are associated with males; a female variable defining a percentage of the potential internet websites to be crawled that are associated with females; an age variable defining a percentage of the potential internet websites to be crawled that are associated with a specified age range; an income variable defining a percentage of the potential internet websites to be crawled that are associated with users having a specified financial income range; and an education variable defining a percentage of the potential internet websites to be crawled that are associated with users having a specified education level.

A demographic variable can to be boosted by modifying any of the following variables: the male variable, the female variable, the age variable, the income variable; and the education variable. For each demographic variable, an average percentage for the demographic variable across all of the potential internet websites can be computed. For each demographic variable, an average percentage for each of the potential internet websites can be computed.

The demographic variables can be boosted by assigning a weighted value to one or more of the demographic variables, and by modifying the weighted value. The weighted value can define the relative importance of each quantity on the average weighted value across all of the potential internet websites. If no boost is assigned to a demographic variable, a weight value of 100% can be assigned to the demographic variable.

The demographic boosting system can process the demographic variable for each potential internet website, which is being assigned a weighted value, by dividing the computed average demographic variable with the computed average percentage for the demographic variable across substantially all of the potential internet websites.

The demographic boosting system can compute, for each potential internet website, an average weighted value across all of the demographic weights for the respective potential internet website.

When boosting the demographic variables, the demographic boosting system computes new target weights for each weighted value by multiplying the average weighted value across all of the demographic weights by a default target weight assigned to compute the new target weight. The new target weight reflects a percentage of sentiments to be pulled from each potential internet website. When determining internet website sentiments that are responsive to the target categories defined by the demographic boosting system, the search engine can eliminate astroturfing, remove re-blogging, and remove spam from the results.

The construct engine can store the sentiments into taxonomic units of data by: identifying a client's brand name; processing an exploratory search of the brand name using a crawling engine; defining the taxonomic units based on a pattern detected in the exploratory search results; identifying keywords that are associated with each pattern; processing a second search to confirm the exploratory search results; and comparing the exploratory search results with the second search results.

When stratifying the internet sampling frame, the system can use specific stratified sampling to target and crawl preselected websites. This can include, for example, sites such as Facebook or Twitter and other well known websites that gather and disseminate data. In another embodiment, when stratifying the internet sampling frame, the system can use categorical stratified sampling to identify types of websites to be crawled. This includes sites that constitute substantially of blogging, microblogging, images, videos, social networking, answers, consumer ratings, and news content, and other general categories. These categories can be used to define the internet sampling frame.

A matrix may be selected that is most appropriate for a user's research. There is a plurality of standard matrices reflecting specific targets to choose from. Custom matrices may also be created to reflect the research needs a user may have.

Standard matrices can include an extensive contributor's matrix, which targets internet websites having content that is being constantly updated. An extensive reader matrix targets internet websites having a high volume of readers, regardless of the amount of contributors to the internet reader website. A popular source matrix targets internet websites having a high volume of registered and active users. A time sensitive matrix targets internet websites having recently updated content. A financial matrix focuses on websites that have higher percentages of information about finances and money. A business matrix focuses on websites that have higher percentages of information about business topics. An apparel matrix focuses on websites that have higher percentages of information about clothing, shoes, and accessories. An electronics matrix focuses on websites that have higher percentages of information about electronics such as televisions and music players. A sports matrix focuses on websites that have higher percentages of information about sporting goods and equipment. An entertainment matrix focuses on websites that have higher percentages of information about current entertainment topics such as movies and music. A travel matrix focuses on websites that have higher percentages of information about traveling. A food & beverage matrix focuses on websites that have higher percentages of information about food and beverages. A restaurant matrix focuses on websites that have higher percentages of information about all types of restaurants, whether fast food or high end full service. A medical matrix focuses on websites that have higher percentages of medical information. A beauty matrix focuses on websites that have higher percentages of information about all types of beauty products. An automotive matrix focuses on websites that have higher percentages of information about vehicles. A home care matrix focuses on websites that have higher percentages of information about home care products. A baby information matrix focuses on websites that have higher percentages of information about infants and toddlers aged 0 to 4. A children information matrix focuses on websites that have higher percentages of information about children who are aged 5 to 12. A teen contributors matrix focuses on websites that have higher percentages of users and readers who are aged 13 to 17. A teen information matrix focuses on websites that have higher percentages of information about people who are aged 13 to 17. An adult matrix focuses on websites that have higher percentages of users and readers who are aged 18 and older. A male matrix focuses on websites that have higher percentages of users and readers who are male. A female matrix focuses on websites that have higher percentages of users and readers who are female. An affluent matrix focuses on websites that have higher percentages of users and readers who have incomes of $75k or more per year. A low income matrix focuses on websites that have higher percentages of users and readers who have incomes less than $75k per year. A scholars matrix focuses on websites that have higher percentages of users and readers who have at least a college degree. A low education matrix focuses on websites that have higher percentages of users and readers who do not have a college degree. Other matrices can be used to reflect various other demographics, verticals, and other aspects of internet usage.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7 is a chart showing the sampling boost process in which calculations for reweighting matrices to boost specific demographic characteristics are preformed according to an embodiment of the invention.

FIGS. 9A-C is a chart listing constructs including a few of the unique words associated with each construct.

DETAILED DESCRIPTION

Components of the invention and relevant interfaces are described below. It is understood that various other implementations and component configurations are suitable. The following is for representative, non-limiting, illustrative purposes.

System Architecture

Figure 1:
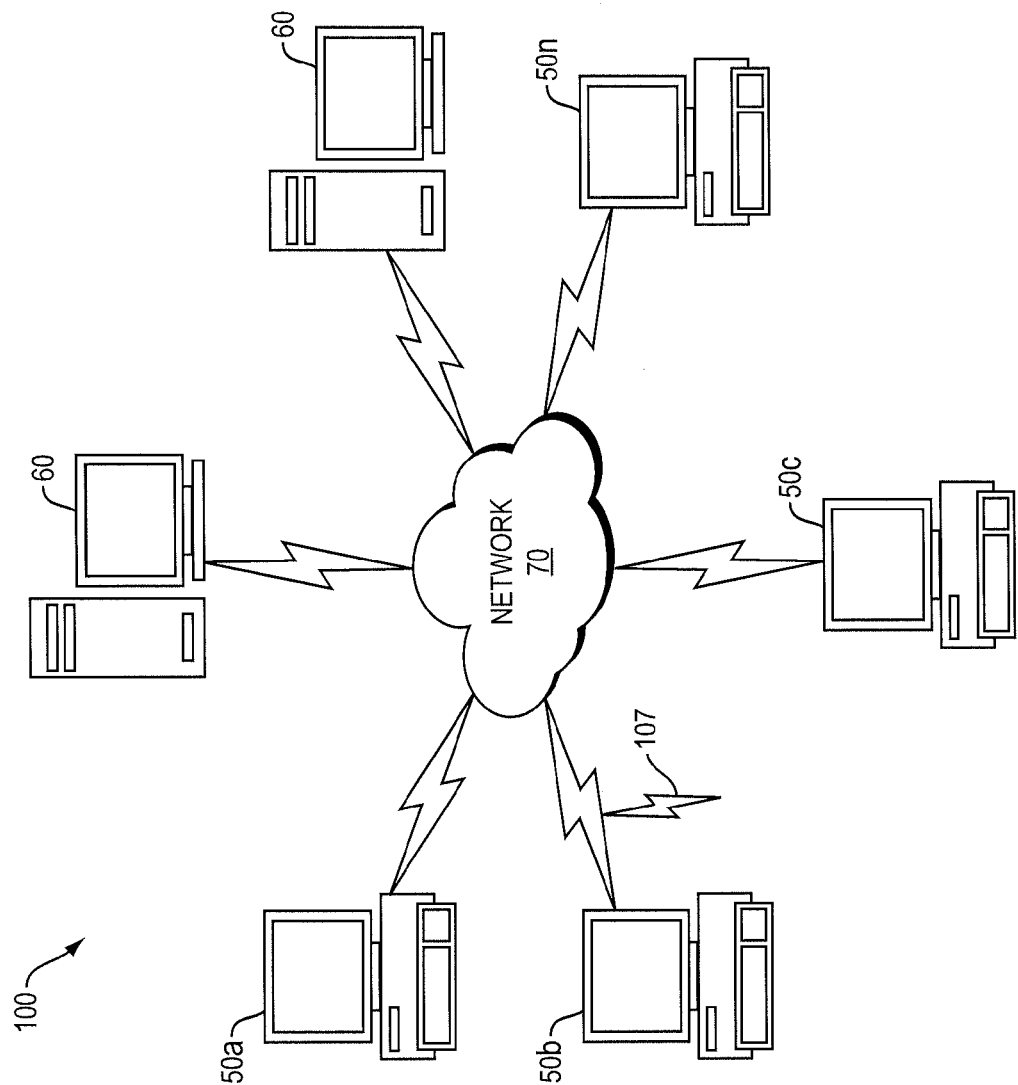
FIG. 1 illustrates a computer network or similar digital processing environment in which example embodiments of that aspects of the present system may be implemented.

Preferably, the invention is implemented in a software or hardware environment. FIG. 1 illustrates a computer network or similar digital processing environment in which example embodiments of the present system 100 may be implemented.

Client computer(s)/devices 50 *a, b . . . n* (50 generally) and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 2:
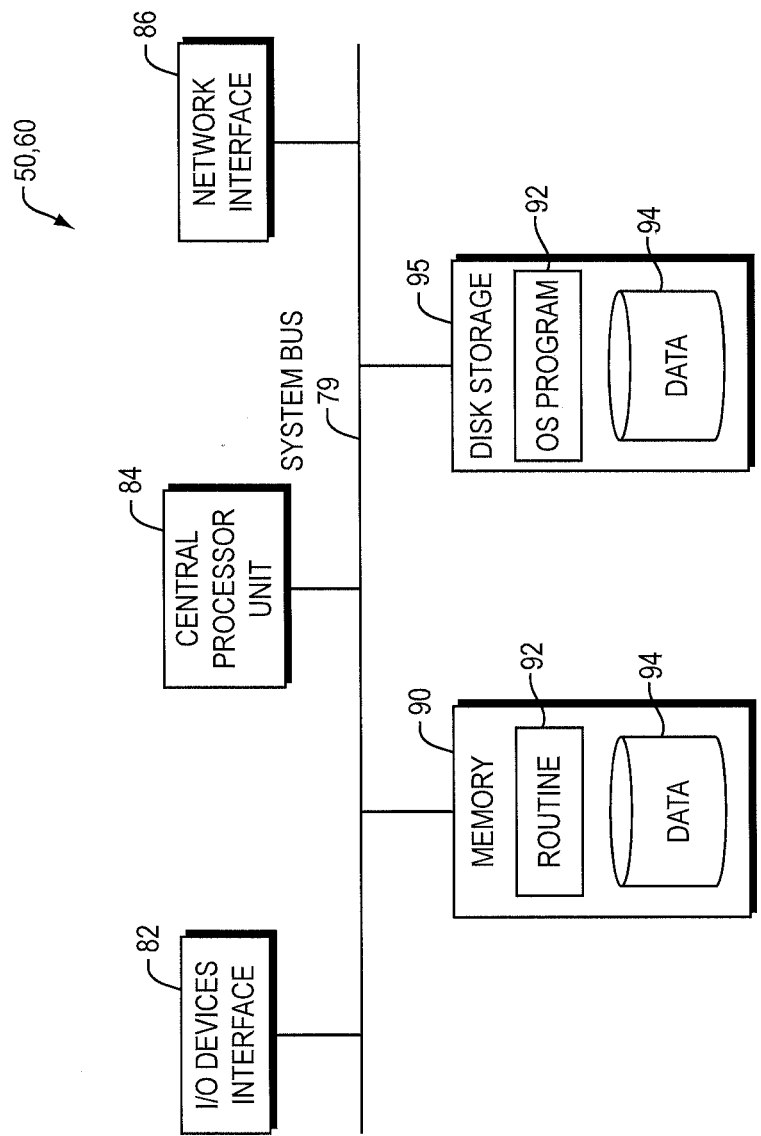
FIG. 2 is a diagram of the internal structure of a computer in the computer system of FIG. 1

Continuing from FIG. 1, FIG. 2 is a diagram of the internal structure of a computer (e.g., client processor/device 50 or server computers 60) in the computer system of FIG. 1. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1). Memory 90 provides volatile storage for computer software instructions 92 and data 94 used to implement an embodiment 100 of the present invention. Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Figure 3:
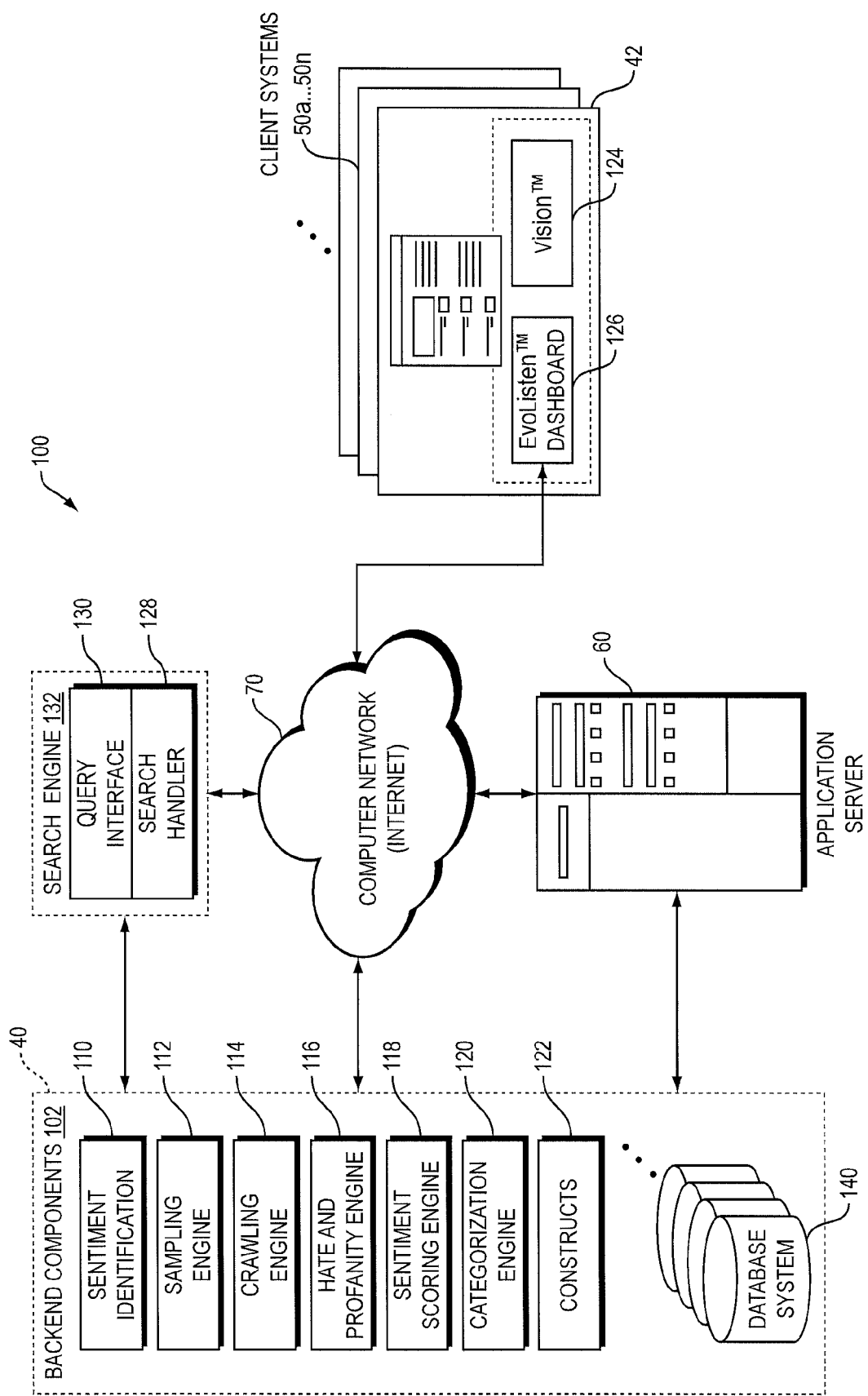
FIG. 3 is a diagram of system architecture in which embodiments of the present invention may be implemented.

Continuing with FIG. 3, the system 100 may include various backend components 102 including a sentiment identification process 110, sampling engine 112, crawling engine 114, hate and profanity engine 116, sentiment scoring engine 118, and construct engine 120. Example embodiments of the system 100 are commercially available by Conversation Strategies Limited.

An example implementation of the client front end 42 of the system 100 uses a web-based interface having two major components. The first component is an engine interface (evolisten Vision™) 124, which provides an interactive visualization of data enabling users to type in specific brand names to view conversations generated online from various websites. The second component is an interactive sentiment modeler (evolisten Dashboard™) 126, which permits viewing of a quantified analysis and summary of positive and negative sentiments regarding a specific brand as sampled from the internet. The client front end components 42 can be hosted by the application server 60.

Example Processes

Figure 4:
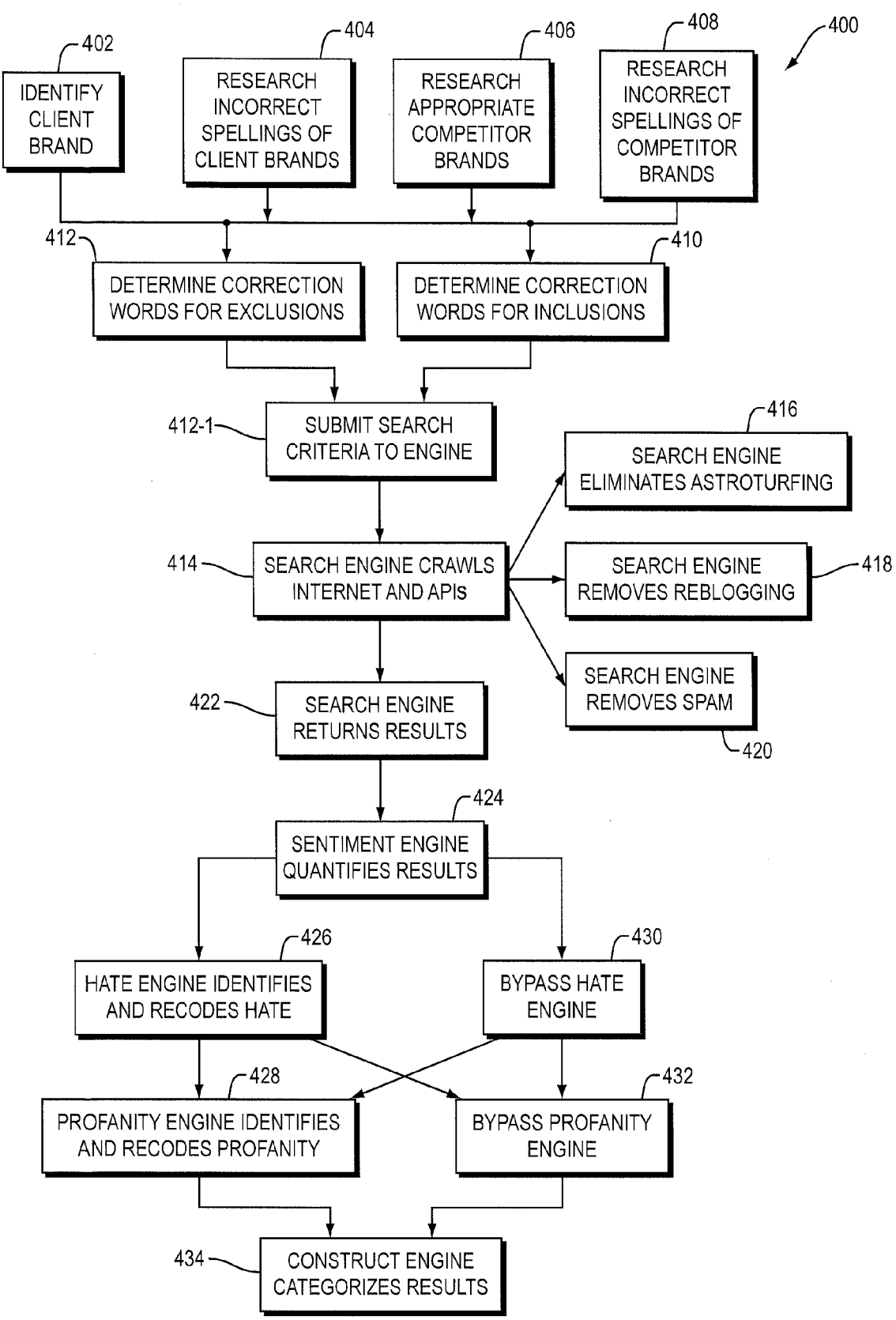
FIG. 4 is a flow diagram showing the crawling and sentiment identification processes according to an embodiment of the invention.

FIG. 4 is a flow diagram showing the crawling and sentiment identification processes 400 according to an embodiment of the invention. Referring to FIGS. 3 and 4, the first stage is for the client 50a to identify which sentiments are for the research and what the appropriate sampling process for gathering those sentiments is 402, 404, 406, 408. Once sentiment identification and the sampling processes 402, 404, 406, 408 are finalized, at 412-1 they are submitted to the search engine 132.

At 414, the search engine 132 enacts various crawlers and API grabbers 114 to choose sentiments according to the predetermined processes (e.g. 416, 418, 420). The search engine 132 deals with astro-turfing 416, a process by which one individual visits many different websites to leave identical or nearly identical messages on each website by reducing nearly identical messages to a single message. In a similar sense, the search engine 132 identifies reblogging 418 and reduces those to a single blog as well (re-blogging is the process by which different blog owners automatically mirror/copy a blog to their own website). Spam is also removed at 420.

At 422, the returned and cleaned data is then passed to the sentiment engine 112. At 424, the sentiment engine 112 evaluates each individual sentiment and scores it according to natural language processing algorithms. Sentiments that are interpreted to be positive are assigned positive numbers while sentiments interpreted to be negative are assigned negative numbers. The greater the magnitude of the number, the more intense the sentiment is. Sentiments that cannot be scored are assigned the value of zero.

At 426, data is then passed to the profanity and hate engine 116. Sentiments that include words identified as hate or profanity are extracted for recoding. These words are recoded into generic nonsense characters such that users can identify that an inappropriate word was used, but they cannot necessarily tell what the word was. These engines can be deactivated by, for example, the request of the client 50, as directed by the 100.

At 434, sentiments then pass through the construct engine 120 whereby sentiments are assigned to one or more constructs according to a set of algorithms. The construct engine 120 uses current marketing research constructs as well as constructs unique to the client brand 402 in question.

Finally, the sentiments are ready to be viewed and analyzed via the sentiment engine interface 124 and the sentiment modeler 126.

Sentiment Identification Process

Examples of the sentiment identification processes are shown in FIG. 4. Users begin by identifying the key brand involved in the research 402. This is usually the client's brand or company (e.g., iPod or Apple Computers). Users identify both correct and common incorrect spellings of the brand 404, whether the incorrect spelling is due to ignorance or accidental typographical errors (e.g., i-pod, Apple). Users then identify a specific number of competitor brands that they wish to monitor 406 (e.g., Zune, Microsoft). Both correct and incorrect spellings of the competitor brand names are researched and finalized 408.

Users then identify the subcategory, category, and industry associated with the brand. For example, the Apple iPod would belong to the MP3 player subcategory, the music player category, and the electronics industry. These words are important because they are used as inclusion words in the next stage, and because they are used as variables in the sentiment modeler 126.

The next stage is to identify inclusion 410 and exclusion words 412. This function is invoked when the brand name is ambiguous and may reflect something other than the intended brand. Inclusion 410 and exclusion 412 words may reflect subcategories (e.g., MP3 players, t-shirts), categories (e.g., music players, clothing), or industries (e.g., electronics, personal attire).

Inclusion words 410 are words that, when associated with the brand, dictate that the sentiment should be extracted. For example, the brand "the Gap," would use as inclusion words such words as "pants" or "shirt" which are subcategory words, as well as category words such "clothes" or "attire." If "the Gap" is identified as a brand that must use inclusion words, the search engine 132 will only select sentiments containing the words "the Gap" if the sentiment also includes one of these inclusion words nearby.

Users also identify relevant exclusion words 412. These are words which, when associated with the brand word, make the sentiment no longer eligible for extraction. For example, though "the Gap" is a well known manufacturer of clothing, it also refers to 'the gap' in the floor or similar such ideas. Thus, for this brand name, any mention of "the Gap" that includes the words "floor" or "door" nearby would not be eligible for extraction.

Figure 5:
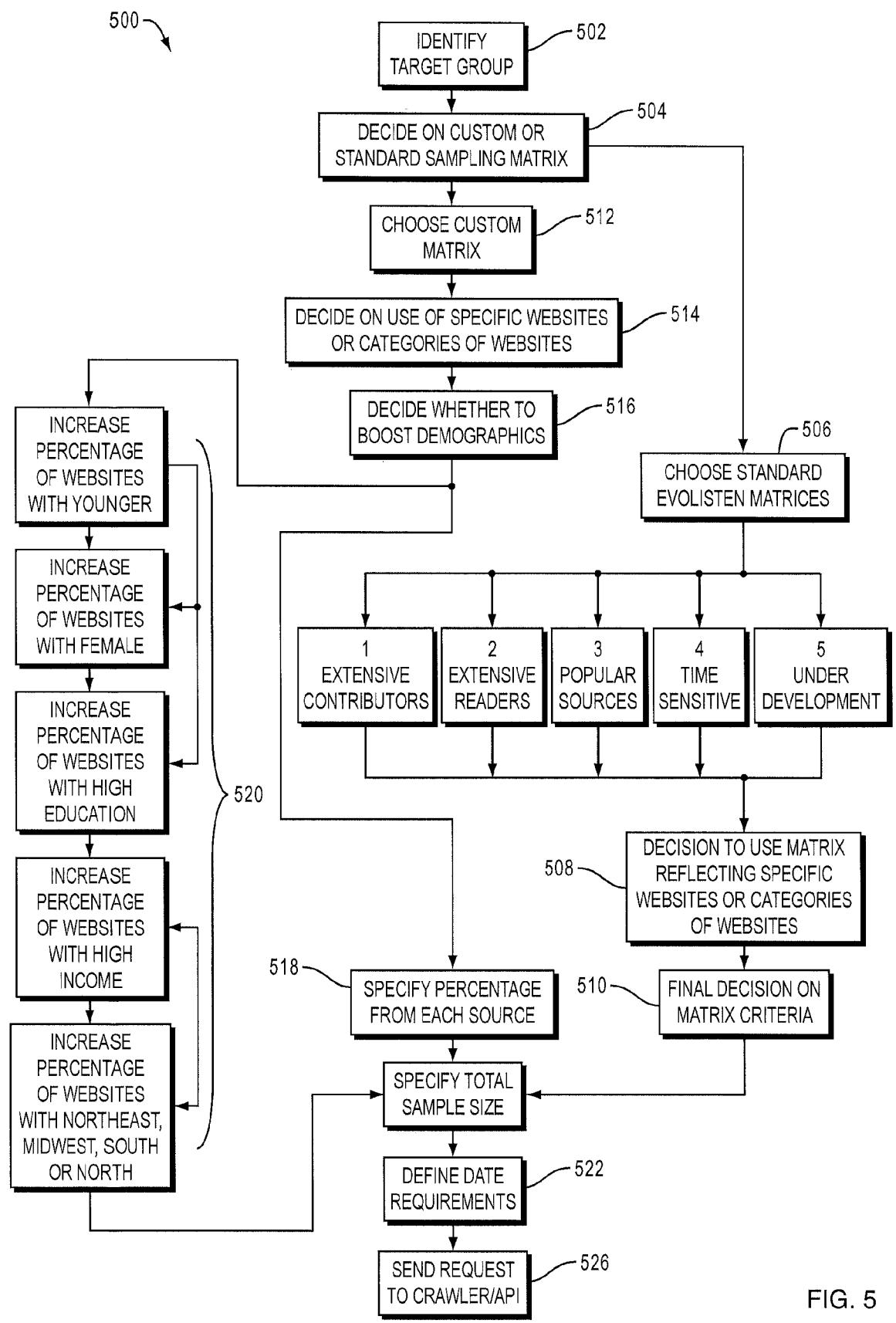
FIG. 5 is a flow diagram showing the sampling process of how sampling matrices are selected and created according to an embodiment of the invention.
Figure 6:
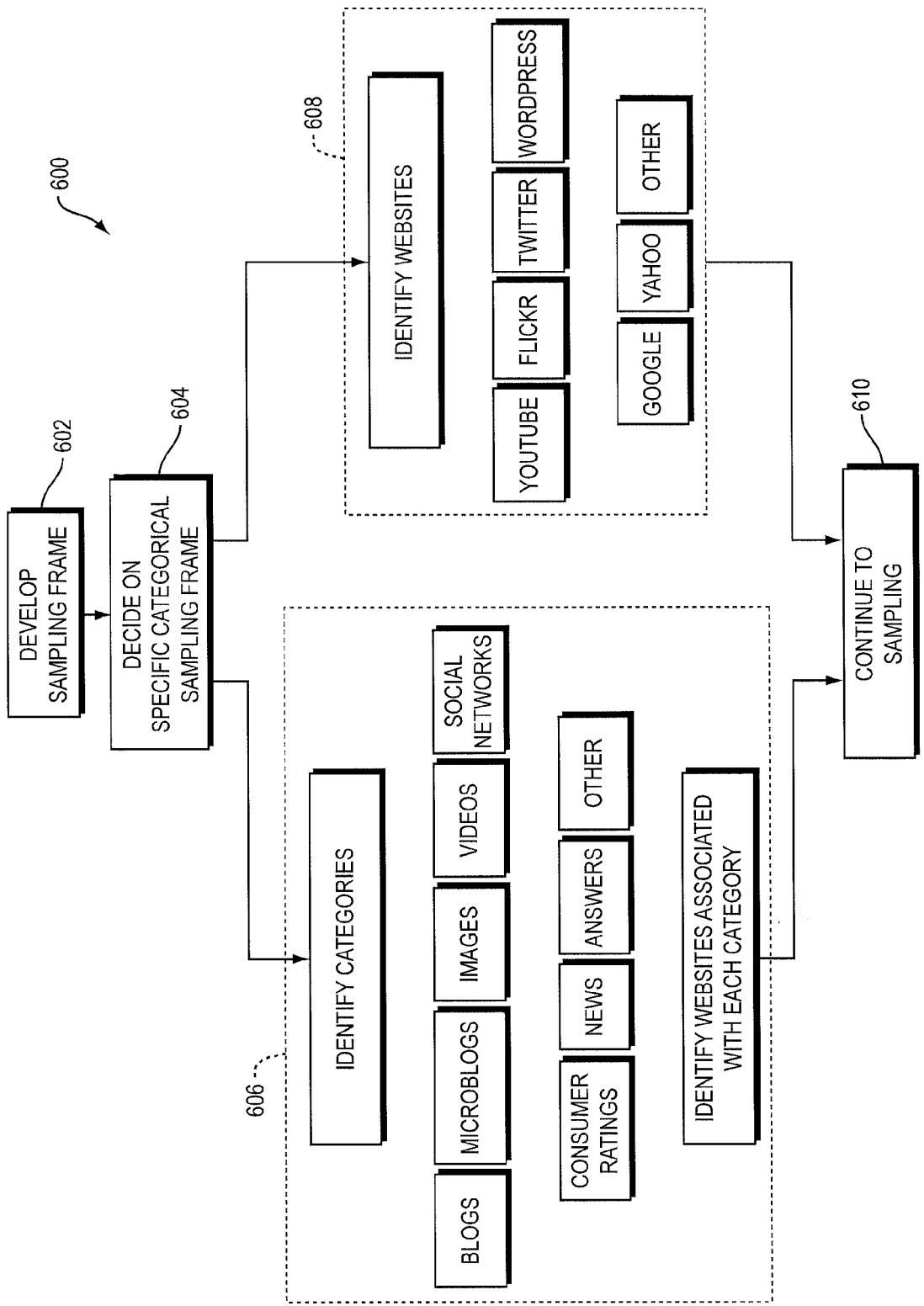
FIG. 6 is a flow diagram showing the sampling matrix process of the differentiation between specific and general matrices.

Inclusion 410 and exclusion 412 words are developed on an individual basis for each brand based on preliminary iterative analyses. They may evolve over time as the client 50*a* and the system 100 carry out additional research to fine-tune results.
Sampling Engine Referring to FIGS. 5 sand 6, one of the underpinnings of the system 100 is that those who use its features take advantage of sampling processes 500, 600. FIG. 5 is a flow diagram showing the sampling process 500 in which sampling matrices are selected and created according to an embodiment of the invention. FIG. 6 is a flow diagram showing the sampling matrix process of the differentiation between specific and general matrices. In short, the sampling processes 500, 600 relate to the methods and systems by which sentiments on the internet are chosen and extracted for inclusion in an analysis. Preferably, the sampling processes offer users several advantages.

First, it is not cost effective to gather all pieces of data relevant to a research project. Since the internet is increasing in size exponentially, physically storing all existing and newly available pieces of data is cost prohibitive.

Second, it is not an efficient use of time to gather all pieces of data. Creating any sort of instant results would be impossible as the search for data could take days and days to complete, while never truly being complete.

Third, statistical theory dictates that it is not necessary to gather all available pieces of data in order to generate valid and reliable research results. Carefully designed sampling processes will produce valid and reliable results, within a known margin of error, from a much smaller pool of data.

This sampling processes 500, 600 ensure that results, regardless of which process or license is relevant for a specific user, have a minimal degree of reliability. In addition, this process will ensure that sampling error is kept to a minimum. Rather than simply gathering whatever data is found first, a method sure to increase sampling error, the inventive sampling plans follow strict rules and can be replicated at a later date. Errors such as over representing one website or failing to attend to another site will be less likely to occur.

At its most basic level, stratified random sampling will be the algorithms employed by the sampling processes 500, 600. Stratified random sampling recognizes that natural groupings or strata are present within a population, and by random sampling within each strata, researchers can ensure that each is appropriately represented in the final sample.

Referring to FIG. 6, the first step of sampling is to identify the sampling frame 602. This entails listing out all of the websites from which relevant data should be gathered. Because the internet is constantly growing, this is inherently an impossible task. Regardless, there are two ways of stratifying the internet sampling frame.

1) Specific Stratified Sampling 606: Several hundred websites are most popular and therefore most relevant for a data crawl. Some sites with a high volume of visitors and contributors include: Facebook, Myspace, Twitter, YouTube, Flickr, Wordpress, Blogger, and Digg. Additional websites well known for gathering and disseminating information include Google and Yahoo. Beyond these several hundred websites, there are millions of other websites that may contain valuable data. These websites cannot be individually listed, though many will be reached via the general sources of Google and Yahoo.

2) Categorical Stratified Sampling 608: This sampling strategy will identify types of websites to be crawled. This includes sites that are primarily made up of blogging, microblogging, images, videos, social networks, consumer ratings, news, answers, and other general categories. These categories form the sampling frame after which time individual websites are associated.

Preferably, the most basic stratified sampling matrix employed within system 100 extract equal percentages of sentiments from each of six sources reflecting unique categories (Facebook, Flickr, YouTube, Twitter, Wordpress, GetSatisfaction). These sources will evolve over time to reflect the most current selection of popular websites reflecting a wide range of types of websites. The percentages will also vary to best reflect current usage of the websites.

Referring to FIG. 5, Clients 50*a* . . . 50*n* who use the inventive process can choose the matrix 504 that is most appropriate for their research. There are a plurality of matrices reflecting very specific targets to choose from. These are called standard matrices. Clients 50*a* . . . 50*n* may also create a customized matrix to reflect other research needs they may have.

Users who select to use a standard matrix have numerous choices. Each matrix focuses on a different set of websites selected for specific purposes.

1. The 'Basic' matrix is the simplest version available and is the default for system 100 users. This matrix includes six specific sources from six different categories in equal percentages.
2. The 'Extensive Contributors' matrix 506-2 focuses on websites that have a lot of people adding information to them. For instance, WordPress and Twitter have a lot of people who are regularly adding information. This matrix assigns higher percentages of crawl returns to websites that have more contributors.

3. Another matrix is called the "Extensive Reader" matrix 506-3. Websites that have a lot of readers, but not necessarily contributors are focused on for this matrix. It may include websites such as YouTube where people go to watch many videos, though they may never contribute a video themselves.

4. The "Popular Source" matrix 506-34 increases the percentage of sentiments crawled from websites that are currently most popular. For instance, Facebook, MySpace, Twitter, Flickr and Youtube are extremely popular. More contributions will be pulled from sites that have high numbers of registered and active users.

5. The "Time Sensitive" matrix 506-5 focuses on websites that are known for having up to the minute information. Twitter is known for sharing news within seconds of it happening. This matrix assigns higher percentages of crawls to websites that have extremely new contributions.

6. The Financial matrix 506-6 focuses on websites that have higher percentages of information about finances and money.

7. The Business matrix 506-7 focuses on websites that have higher percentages of information about business topics.

8. The Apparel matrix 506-8 focuses on websites that have higher percentages of information about clothing, shoes, and accessories.

9. The Electronics matrix 506-9 focuses on websites that have higher percentages of information about electronics such as televisions and music players.

10. The Sports matrix 506-10 focuses on websites that have higher percentages of information about sporting goods and equipment.

11. The Entertainment matrix 506-11 focuses on websites that have higher percentages of information about current entertainment topics such as movies and music.

12. The Travel matrix 506-12 focuses on websites that have higher percentages of information about traveling.

13. The Food & Beverage matrix 506-13 focuses on websites that have higher percentages of information about food and beverages.

14. The Restaurant matrix 506-14 focuses on websites that have higher percentages of information about all types of restaurants, whether fast food or high end full service.

15. The Medical matrix 506-15 focuses on websites that have higher percentages of medical information.

16. The Beauty matrix 506-16 focuses on websites that have higher percentages of information about all types of beauty products.

17. The Automotive matrix 506-17 focuses on websites that have higher percentages of information about vehicles.

18. The Home Care matrix 506-18 focuses on websites that have higher percentages of information about home care products.

19. The Baby Information matrix 506-19 focuses on websites that have higher percentages of information about infants and toddlers aged 0 to 4.

20. The Children Information matrix 506-20 focuses on websites that have higher percentages of information about children who are aged 5 to 12.

21. The Teen Contributors matrix 506-21 focuses on websites that have higher percentages of users and readers who are aged 13 to 17.

22. The Teen Information matrix 506-22 focuses on websites that have higher percentages of information about people who are aged 13 to 17.

23. The Adult matrix 506-23 focuses on websites that have higher percentages of users and readers who are aged 18 and older.

24. The Male matrix 506-24 focuses on websites that have higher percentages of users and readers who are male.

25. The Female matrix 506-25 focuses on websites that have higher percentages of users and readers who are female.

26. The Affluent matrix 506-26 focuses on websites that have higher percentages of users and readers who have incomes of $75k or more per year.

27. The Low Income matrix 506-27 focuses on websites that have higher percentages of users and readers who have incomes less than $75k per year.

28. The Scholars matrix 506-28 focuses on websites that have higher percentages of users and readers who have at least a college degree.

29. The Low education matrix 506-29 focuses on websites that have higher percentages of users and readers who do not have a college degree.

30. Additional matrices 506-30 can be used to reflect various other demographics, verticals, and other aspects of interne usage.

Users then choose whether they wish their matrix to reflect specific websites, or general types of websites.

Users who decide to create a custom matrix follow a separate process. First, they decide whether they wish to use specific websites or categories of websites. Then, users must decide whether they wish to boost certain demographic characteristics. The algorithm for boosting demographics follows here.

Sampling Demographic Boost

Users who wish to boost demographics follow a specific process. The present system 100 has classified various websites in terms of demographics such as age, gender, education, income and region. When the client 50a identifies which demographics are to be boosted, the sampling engine increases and decreases the percentage of sentiments pulled from each source to reflect that requirement. The process for boosting is as follows:

1. List every website source to be crawled (e.g., YouTube, WordPress, Twitter)
2. Identify the default target percentage of sentiments to be crawled for each website source (e.g., if the default strategy is that four sources are sampled equally, each source will then represent 100%/4=25% of the final sampled returns)
3. For each website source, identify the percentage that reflects each specific demographic variable (e.g., W % of source A is male, X % of source A is aged 18 to 45, Y % of source A has income from 0 to $49k, Z % of source A has education up to but no more than high school)
4. For each demographic variable, calculate the average percentage of the variable across all website sources (e.g., Males are 68% of Source A, 48% of Source B, 55% of Source C, and 18% of Source D, giving an average percentage of (68%+48%+55%+18%)/4=47%)
5. Determine which demographic variables are to be boosted (e.g., Client wants to boost age 18 to 45 and income of $50k or over).
6. Determine demographic weights for each source
   a. When boost is not required for a demographic variable, assign the weight of 100% to the variable.

b. For each website source where the boost reflects the demographic variable being described, divide the source demo percent by the average demo percent (e.g., seeking to increase young people using young people variable: 78%/49%=160%).

c. For each website source where the boost does NOT reflect the demographic variable being described, subtract each percent from 1 and then divide the source demo percent by the average demo percent (e.g., seeking to increase high income people using low income variable: (1-60%)/(1-51%)=81%).

7. For each source, calculate the average weight across all the demographic weights (e.g., (160%+100%+81%+100%)/4=110%).

8. For each source, multiply the new overall weight by the default target to get the new target (e.g., 110%*25%=28%)

9. New targets reflect the percentage of sentiments that are to be pulled from each source At this stage, all three options (Standard matrix, Custom with boost, Custom without boost) redirect into the same process. Users indicate the sample size that they are interested in. This may range from 100 total extractions per day up to all available extractions, which could be thousands.

Users then define the time frame they are interested. This may range from 1 day up to 2 years depending on the client's license.

At this point, the request is sent to the search engine for crawling and extraction.

Crawling Engine

The crawling engine 114 is a third party application including inventive refinements for which sources are used, which variables are selected, and how much data is selected. FIG. 4 is a flow diagram showing the crawling and sentiment identification processes according to an embodiment of the invention.

Profanity and Hate Engine

The profanity and hate engine 116 is an internally developed application. The engine takes advantage of the automated constructs engine to identify new and emerging hate and profanity words.

Construct Engine

After being sampled and extracted from the internet, every sentiment is passed through the construct engine 120, which is analogous to the qualitative method of content analysis. The construct engine 120 is an automated engine that applies rules to sort and organize sentiments into meaningful, taxonomic units of data. It creates an objective, systematic, quantified description of the content of the written communications.

Figure 8:
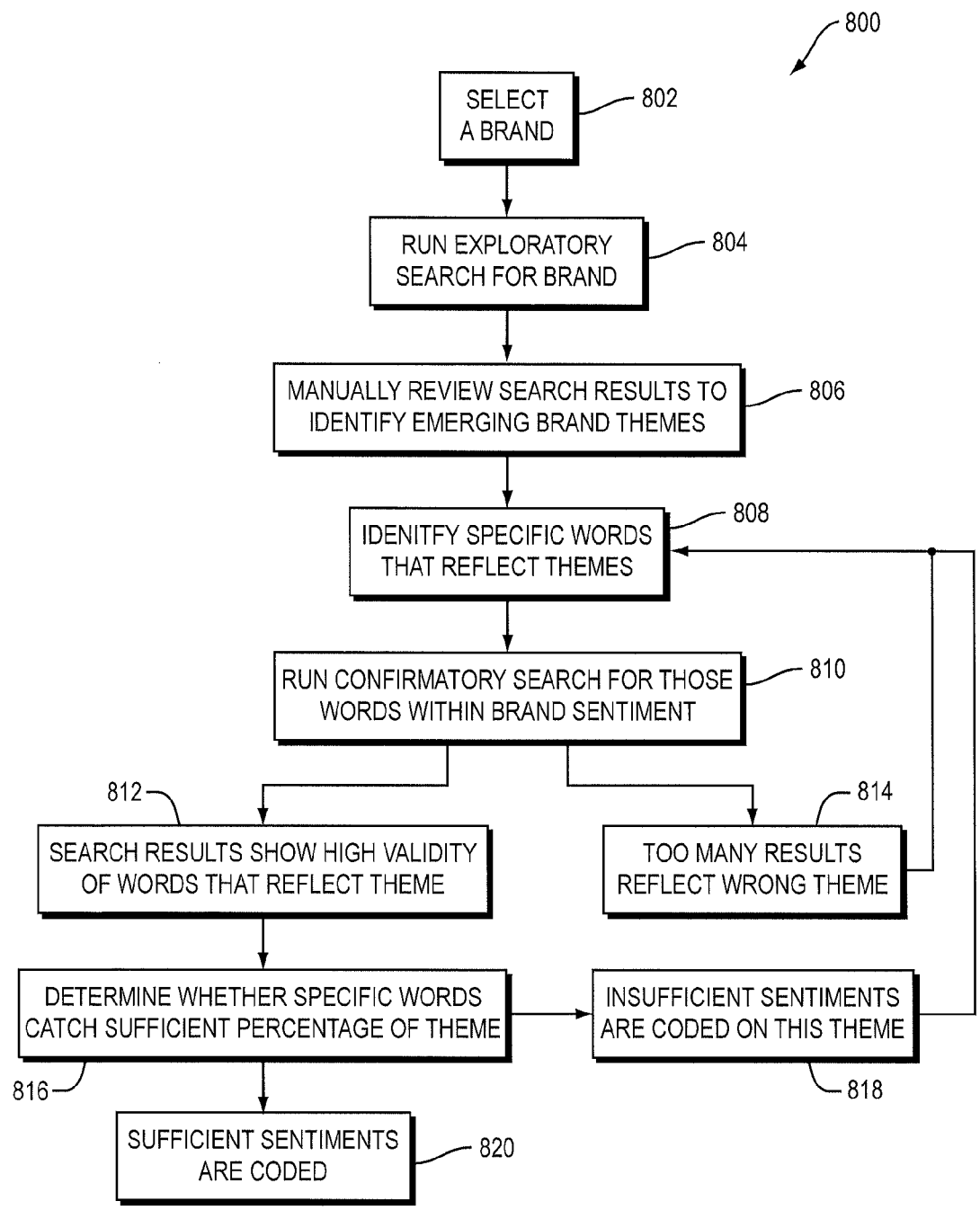
FIG. 8 is a flow diagram showing the construct development process in which constructs are discovered and created according to an embodiment of the invention.

Through detailed preliminary analyses, the system 100 has carefully developed over 1,000 unique constructs 122 that reflect the most important measurements within marketing research as well as niche constructs reflecting specific categories. In Appendix A, a list of example constructs is provided. FIG. 8 is a flow diagram showing the construct development process 800 in which constructs 122 are discovered and created according to an embodiment of the invention. FIGS. 9A-C is a chart listing constructs including a few of the unique words associated with each construct. The process for developing constructs 120 is as follows.

1. Identify the client's brand name 802.
2. Run an exploratory search of the brand name 804 using the crawling engine 114.
3. Review the results and define units in terms of the various themes presenting themselves 806.
4. Identify key words that are uniquely associated with each theme 808.
5. Run a second confirmatory search for those words within the brands' sentiments 810.
6. Evaluate whether the returns accurately reflect the intended theme 812.
   a. Where too many returns do not accurately reflect the theme, return to stage of identifying key words and refine the selection 814.
7. Evaluate remaining, uncoded sentiments to determine whether many of them still reflect the intended theme 816.
   a. Where too many uncoded sentiments remain, return to stage of identifying key words and add to the selection 818.
8. Theme is complete 820.

Figure 15:
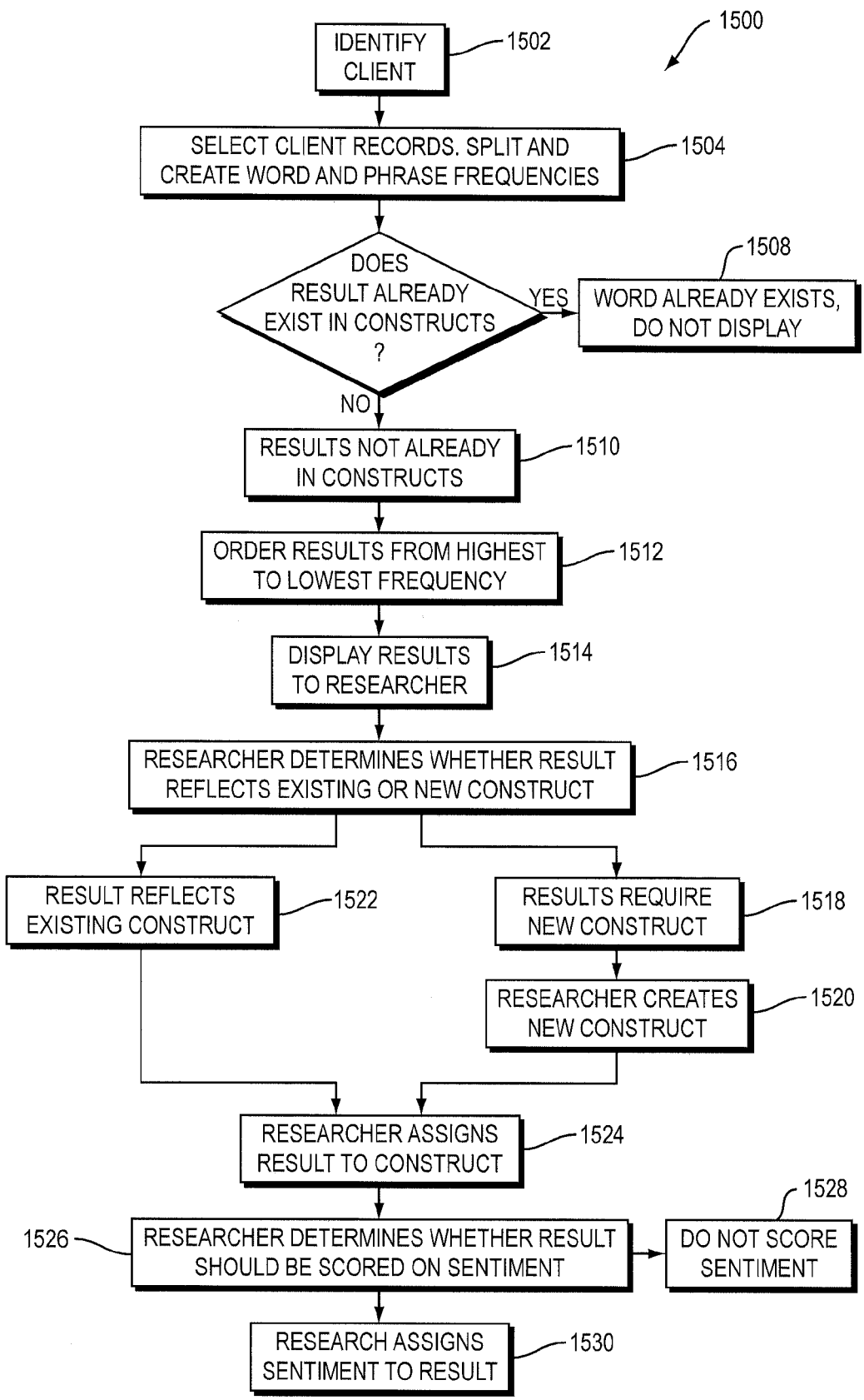
FIG. 15 is a flow diagram showing the automated construct process according to an embodiment of the invention.

The automated construct engine 120 can serve to enhance and create new constructs 122. FIG. 15 is a flow diagram showing the automated construct process 1500 according to an embodiment of the invention. This process 1500 identifies words and phrases that appear in the data more frequently than other words and phrases 1502, 1504, 1506. It recognizes which words already exist in the constructs and ignores those 1508. The remaining words and phrases not already in the constructs 1510 are presented to the researcher 1514 on a screen which allows them to assign the new word to an existing construct 1522, 1524. If the system deems the word to require building a new construct 1518, then a new construct 122 is built 1520 and the word is added to that construct 1524. It is then determined whether the result should be scored based on sentiment 1526.

Sentiment Engine

The sentiment engine 118 uses natural language processing information to identify negative and positive sentiments within selected word series. Those sentiments identified as positive receive positive numbers whereas negative sentiments receive negative numbers. Numbers larger in magnitude represent stronger sentiments. (e.g., "I love food" might be coded as +5 whereas "I like food" might be coded as +2. Conversely, "I am not fond of food" might be coded as −2 whereas "I detest food" might be coded as −7.)

The MatterMeter data collection source offers the sentiment engine 118 a unique and otherwise unattainable source for 'teaching' the sentiment engine about positive and negative sentiments. Because MatterMeter is based on pre-coded sentiments, it can provide the sentiment engine with near perfect assessments of what type of sentiment should be positive or negative. This will allow the sentiment engine to better code existing data.

Figure 14:
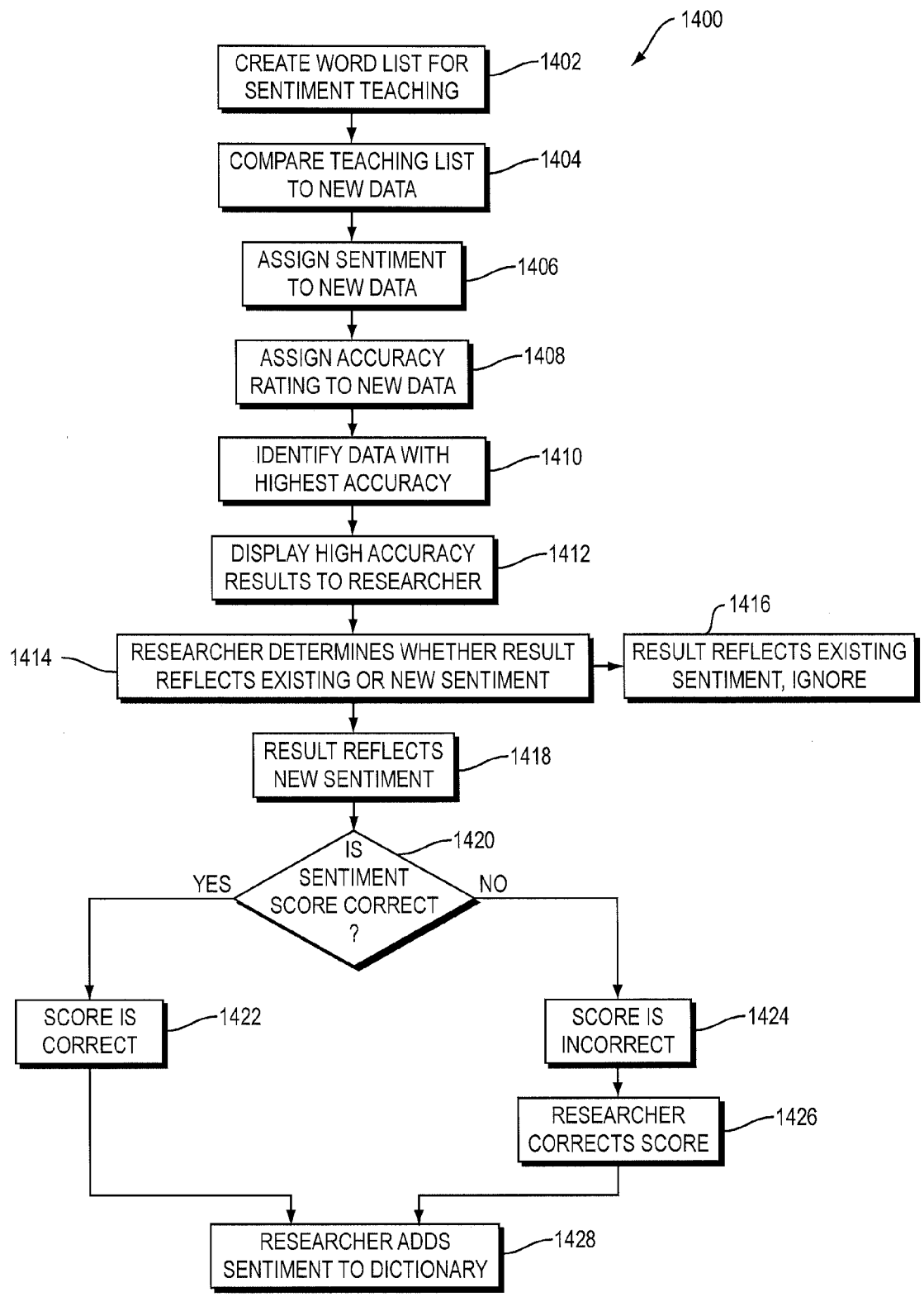
FIG. 14 is a flow diagram showing the automated sentiment scoring process according to an embodiment of the invention.

The sentiment engine 118 can also include an automated process for identifying words and phrases that do not currently exist in the sentiment engine 118. FIG. 14 is a flow diagram showing the automated sentiment scoring process according to an embodiment of the invention. The automated process 1400 first may use a manual selection of words and phrases that have been predetermined to be positive or negative 1402. The sentiment engine 118 then compares at 1404 existing data that includes those predetermined words with new data that does not include those predetermined words. Based on the comparisons, the new data is assigned a sentiment score 1406 and an accuracy score. The accuracy score reflects the certainty with which the engine believe the score to be accurate 1410.

Data which is assigned a very high accuracy score is identified 1410 and brought to the attention of human researchers 1412. At 1414, the researchers assess the data to determine whether the word or phrases already exists in the sentiment engine 118. If the word reflects an existing sentiment, then it is ignored 1416. If the word is new 1418, then the researcher identifies the components of the data that have sentiment associated with it and then assesses the accuracy of the score 1420. If the score is deemed to be accurate 1422, the score and data components are added 1428 to the sentiment engine 118. If the score is inaccurate 1424, then the score is corrected 1426, and added to the sentiment engine 1428.

Website Presentation

The website presentation of the present invention can include two major components. The first is an interactive visualization of data whereby users type in specific brand names to view conversations generated online from various external sources such as Twitter, Facebook, Youtube and Flickr. This feature is the engine interface 124.

The second component is a quantified analysis and summary of positive and negative sentiments using charts and reports regarding the client's specific brand. This feature is called the sentiment modeler 126.

Sentiment Engine Interface

The sentiment engine interface 124 is a visual representation of data gathered according to the system's 100 inventive sampling 112 and analysis processes 110, 116, 118, and 120. The engine interface 124 renders positive and negative sentiments using image sizes and colors. Users can click on various portions of the visualization to indicate which brands they are interested in, which sources they would like to see, which time frame they would like to see. Users can also click directly on specific sentiments to view the sentiment in its original format whether on YouTube, WordPress, Twitter, or another source.

Figure 11:
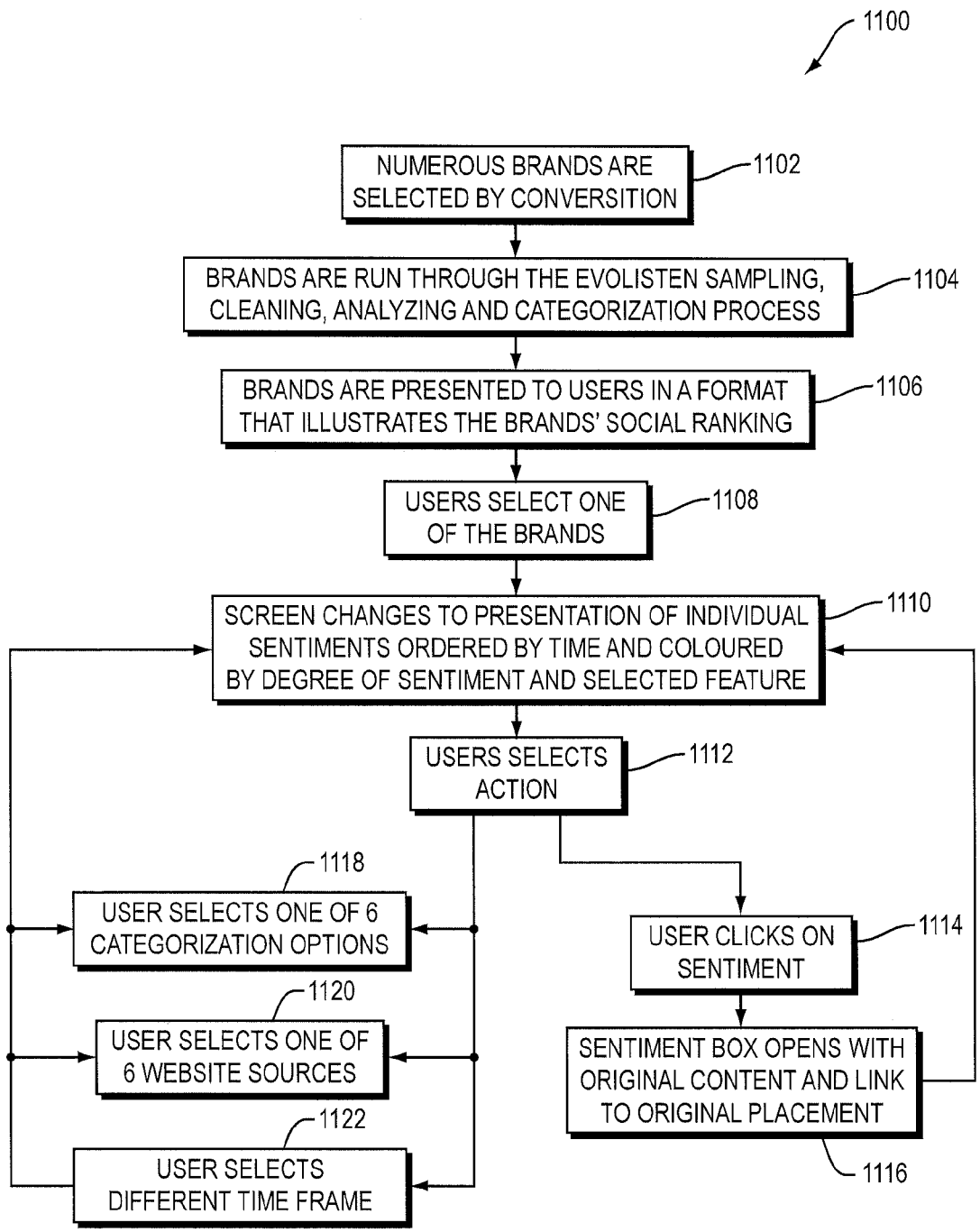
FIG. 11 is a flow diagram showing the website engine interface process specifying how users navigate through the engine interface page interface according to an embodiment of the invention.

FIG. 11 is a flow diagram showing the website sentiment engine interface process 1100 specifying how users navigate through the vision (engine interface 124) page interface according to an embodiment of the invention. At 1102, the sentiment engine interface 124 various brands to be selected for processing using engines 112, 116, 118, and 120. At 1104, brands are run through the various the engines 112, 110, 116, 118, and 120 to sample, clean, analyze and categorize each sentiment. At, 1106 the set of selected brands is first presented to users in a visually pleasing way which demonstrates each brand's social ranking in comparison to the other brands. At 1108, users select one brand to focus on.

At 1110, users are taken to the next screen which shows the actual sentiments. Sentiments are presented in a format which illustrates the positive or negative attributes as scored by the sentiment engine 118. Sentiments are presented ordered by time using motion. At 1112, users select an action. For example, the following actions can be selected:

Do nothing: Watch the sentiments as they slowly pass by the screen in date order.
- Selection category 118: Users can select one of 6 constructs. Only sentiments that have been categorized into that construct will display on the screen. Website sources 1120: Users select one or more of up to 6 sources. Only sentiments sourced from those websites will display on the screen.

Time frames 1122: Users select one of the several timing options. Only those sentiments within the selected time frame display on the screen.

User click on a sentiment 1114 to view the original text, video, photo, or sound.

Users can click on the link 1116 to view the sentiment in its original placement.

In this way, users can continue clicking through various options and sentiments (e.g. 1114, 1116, 1118, 1120, and 1122) as desired.

Interactive Sentiment Modeler

Preferably, with the interactive sentiment modeler 126, the user does not need to download any files (e.g. software) to their computer. The sentiment modeler 126 is interactive and enables users to drill down to various points of data.

A number of different reporting views will be available depending upon the user's choice of license, and will include the following:

Vision Page (engine interface) 124—This page is the interactive visualization of data developed specifically for the system 100 by a third party.

Figure 12:
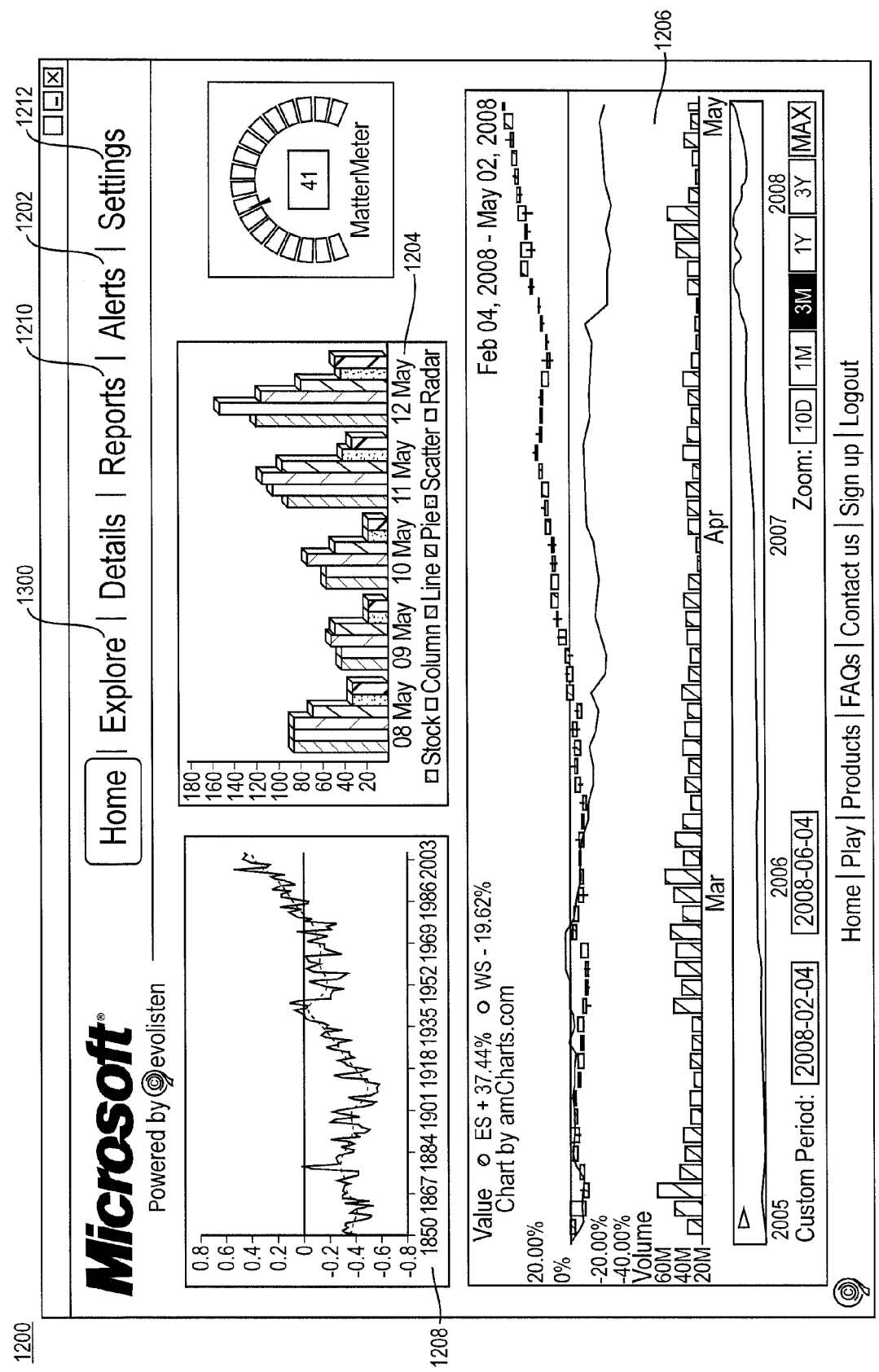
FIG. 12 is a screenshot of the homepage according to an embodiment of the invention.

Home Page 1200—FIG. 12 is a screenshot of the home page 1200. The home page 1200 will come standardized with numerous features. Basic features include the client's name, brand, and logo. It also includes a standardized menu bar to permit transitions between various web pages and features. The home page will include an "Alert" feature 1202 which highlights whenever an alert has been identified. The home page will also include a MatterMeter component for the client's specific brand. Additionally, the homepage includes several summary charts 1204, 1206, 1208. The first default chart is a bar chart 1204 of the past week and previous week, for the marketing mix measures (price, product, placement, and promotion). The second default chart is a past week and previous week bar chart of key marketing research measures (purchase intent, recommendations, brand awareness and brand trial). The third default chart will be a past 6 month, weekly line chart of the system's 100 Equity Evaluation. Each of these charts can be removed from the home page as desired by the user. The home page 1200 is shown including these charts. Clients can request a customized homepage including any chart of their choice.

Settings Page—The setting page 1212 allows users to view and adjust their basic information. The users logo, brand name, alternative spellings, and competitive brands are listed here, as well as the brand's subcategory, category, and industry. Users provide their email address here along with any other email addresses that the client may wish to send reports to at a later date. Users can select the colors settings for their charts such that they match the brand's colors. New users will receive helpful messages throughout their use of the present system 100, messages which can be turned on and off on this page. A separate page in the Setting area allows users to select and deselect from among the sets of constructs or individual constructs according to whether the client feels the construct is relevant or important to their brand. Choosing a construct on this page will make it viewable on other screens. Clicking on any of the construct names will present the user with a definition of the construct.

Sampling Page—On this page, users identify what their sampling plan is. Each standard matrix is named and defined for users here. Custom matrices are prepared here as well.

Figure 10:
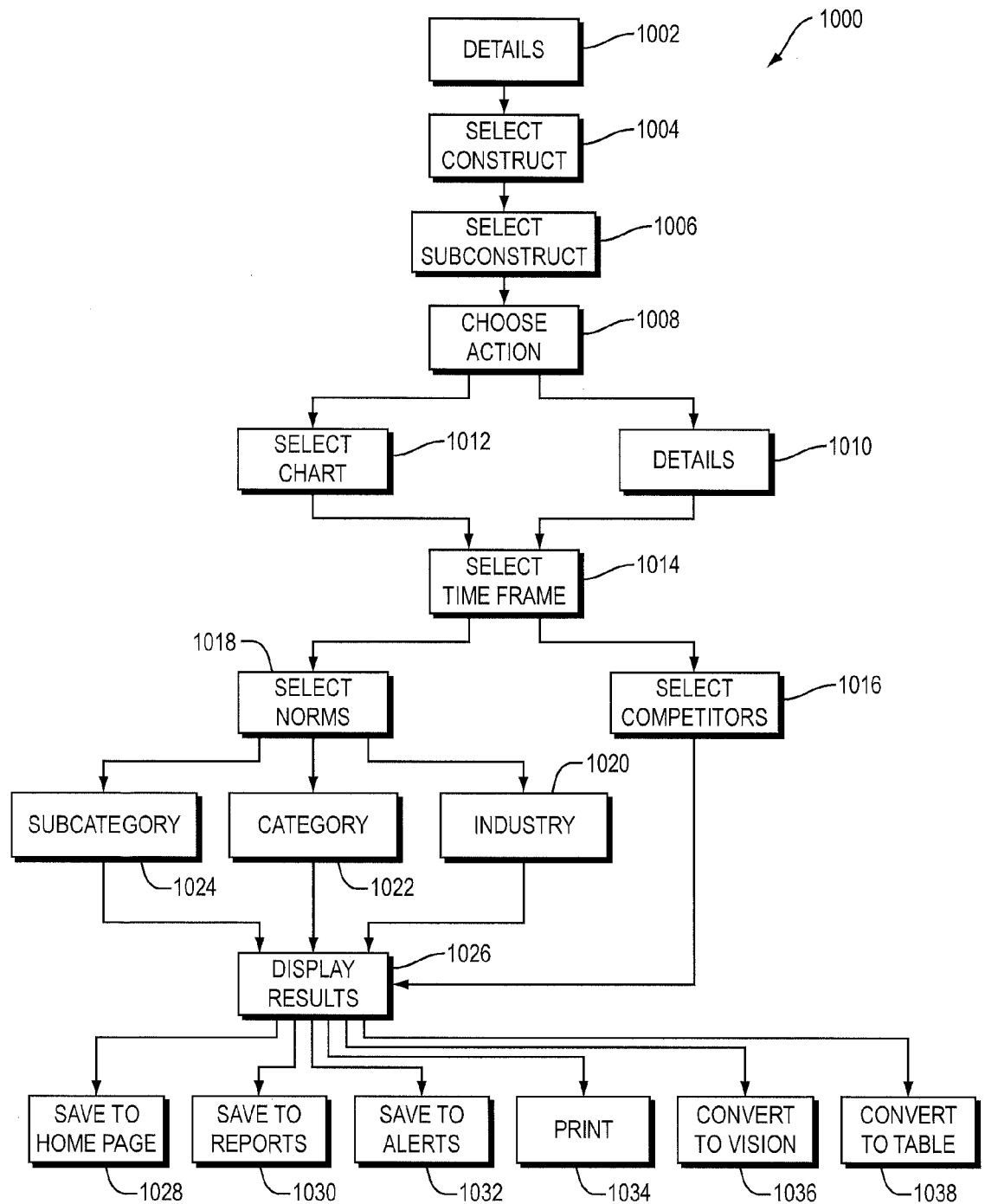
FIG. 10 is a flow diagram showing the website explore process according to an embodiment of the invention.
Figure 13:
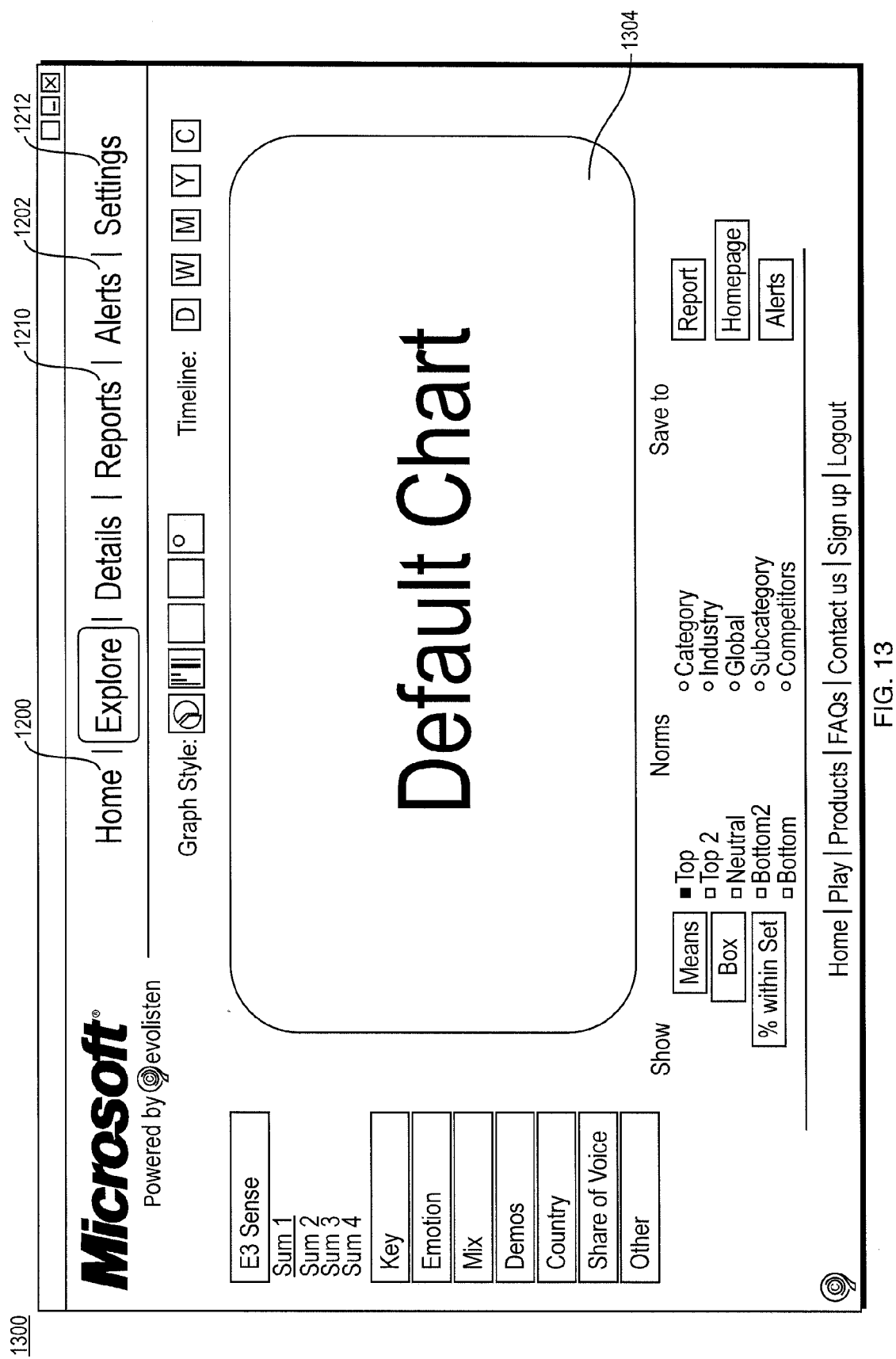
FIG. 13 is a screenshot of the explore page according to an embodiment of the invention.

Explore Page—FIG. 13 is a screenshot of the explore page according to an embodiment of the invention. The explore page is the foundation of exploration on the present system 100. FIG. 10 is a flow diagram showing the website explore process 1000 according to an embodiment of the invention. A default chart 1304 may be displayed on this page regardless of what construct is currently selected. The default chart 1304 is a 6 month line chart of the invention's Equity Evaluation. Users have two major options. First, they can use the "Random Chart" feature which selects one chart from a predefined list of appropriate charts. More than 50 charts have been defined and can be scrolled through. Second, they can act on the Random Chart, or create their own unique chart by following this process:

Chart—Users have numerous chart options to select 1012 from including pie, bar, scatter, line, radar, boxplot, and EmotiChart. Clicking on any of the chart icons will automatically redraw the existing chart in that format unless underlying rules preclude it. These rules ensure that users do not have to have a high level of knowledge about creating quality charts in order to achieve a quality chart. Some of the precluding rules include:
  a. Pie charts will only be drawn for the "Share of Voice" variable
  b. Scatter charts will only show for 2 or 3 variables at one time. Charts with more variables will automatically select the first 3 variables. Charts with 1 variable cannot use scatter charts.
  c. Radar charts will only report on the first 4 to 10 variables.
  d. Line charts will only report on up to 10 variables.
  e. Boxplots will only report on up to 10 variables.
  f. 3D chart options will never be a default.

Measure—Client can choose between the display of mean scores or box scores. Mean scores show average sentiment scores. Box scores show the percentage of sentiment scores that fall within a predefined range. This predefined range will be determined based on preliminary research (e.g., sentiment scores from −10 to −8 will be a box score of 1, −7 to −3 will be a box score of 2).

Comparison—Client can select or deselect any of these options to add or remove a charted variable:
  a. subcategory norms 1024: As defined in the settings page, this variable illustrates sentiment scores averaged across a number of competitive brands in the same subcategory.
  b. category norms 1022: As defined in the settings page, this variable illustrates sentiment scores averaged across a number of competitive brands in the same category.
  c. industry norms 1020: As defined in the settings page, this variables illustrates sentiment scores averaged across a number of competitive brands in the same industry.
  d. global norms 1018: This variables illustrates sentiment scores averaged across a random selection of brands from any category regardless of whether it relates to the client's brand.

Competitors—Users can select or deselect which competitors 1016 they wish to see in the chart. Competitors must be previously defined on the settings page.

Construct—Users can select which one of the pre-defined constructs 1004 to monitor sentiment around that specific construct.

Action—Users have various options to select from once they are satisfied with the chart they have prepared.
  a. Save the chart to a new or existing report 1030
  b. Save the chart to their home page 1028
  c. Save the chart to their alert page 1032
  d. Switch over the Detail page while maintaining these specifications 1038
  e. Switch over to sentiment engine interface 124 while maintaining these specifications 1036

Free Flow—The Free Flow page is similar to the Explore page except that instead of charts, verbatim sentiments are displayed. Thus, users specify which constructs they wish to see, what timeline they are interested, and whether they would like to see sentiments from other categories or competitors. In addition, users can specify whether they would like to see a random selection of total sentiments, or sentiments in the top or bottom of sentiment scores. Various actions can take place with these sentiments. Users can save their final selection of sentiments to a new or existing report, export them to a PDF or excel file, save them to their homepage. They can also make notes on each sentiment should they wish to assign it as an action to someone.

Alerts 1202—The alerts page 1202 has three default auto alerts which can be deleted by the users. Users can adjust the notification criteria for each alert. For example, users can specify whether they want to be alerted if measure is more than 10% or 20% or 30% different from an average weekly or monthly measure.

Reports 1210—On the reports page 1210, users can take actions on various predefined or custom charts. They can rename, delete, print, save to pdf, save to excel, or set up automatic emailing of reports. Further, they can adjust the contents of each report including adding titles or commentary, and reordering or resizing charts.

EvoLive Page—On the EvoLive page, users can see the most up to date results for their brand. Results may be hours old and can be used for crisis management.

EXAMPLE FEATURES

The following list of example features is for representative, non-limiting, illustrative purposes.

Sampling processes 112—Currently, conventional systems typically show every sentiment available for the search terms from a specific timeframe and from specified sources. Generally, with conventional systems, there has been no attempt to select an appropriate sub-sample of sentiments for users. According to well known statistical principles, there is no need to select all available sentiments because a selection of a smaller number of sentiments can yield a similar quality of results. Further, appropriate sampling means that a higher quality of sentiments will be revealed because the process is much less likely to inadvertently select a biased set of sentiments.

Standardized sampling processes—Currently, conventional systems do not offer standardized methods of selecting sentiments for analysis. As such, if one small website has 1000 mentions of a brand today, and nine other websites have only ten mentions each, that one website will have a huge influence on the results. A standardized process means that that one website will never account for more than the predefined percentage associated with that brand. Thus, a standardized process would randomly select ten sentiments from each of the ten websites, such that every website contributed 10% of the sentiments for the brand. This process ensures that even if a spike appears for one website due to random factors, it will not affect the overall results.

Customized sampling—Users can choose to use one of the predefined sampling matrices, but if they have a unique problem, they can create a matrix to suit that specific need.

Data quality strategies—The present system 100 includes features to ensure that the data collected is of the highest quality possible. This includes the specifications of alternate (incorrect) spellings, specifications for excluding or including search terms, ways of reducing the impact of astroturfing and re-blogging, and dealing with hate and profanity.

Marketing researchers—Unlike competitive products which were created by database analytics for marketers, the present system 100 was created by researchers for researchers. As such, all processes, analytics, constructs, measures, charting, and reporting processes were designed to meet the very specific needs of marketing researchers.

Issues Resolved

The following list of example issues addressed is for representative, non-limiting, illustrative purposes.

Actionability—Conventional systems are typically not actionable by marketing researchers for several reasons.

1) They fail to quantify, either in whole or part, online sentiments according to established frameworks of measurement. Simply counting occurrences of words or searches is an insufficient, and potentially wrong, measure of a brand. Marketing research goes beyond simple counting and includes quantification of sentiments on standardized agreement scales (e.g., strongly agree, somewhat agree, neutral, somewhat disagree, strongly disagree). This is the only way to convert findings to actionable findings. Having discovered a method for quantifying online sentiment, the present system 100 will meet this need.

2) They fail to categorize sentiments according to standard marketing research constructs. The present system 100, however, includes a construct engine 120 to process sentiments and associate them with relevant constructs. More than 1,000 constructs have been created and evaluated to ensure that they produce the highest level of accuracy.

3) Current products also fail to provide sub-category, category, and industry norms and trends for sentiments. Within marketing research, it is often insufficient to monitor one's own brand without also considering primary and secondary competitors. The present system 100 includes a database system 140 to permit these types of comparisons.

Relevance—Current products in the market place monitor search term using counts. Counts of search terms, placements, comments, and sharings are irrelevant to marketing researchers. Not only do they fail to associate the counts with constructs specific to marketing research constructs, they fail to identify the sentiment associated with a brand. Highly popular searches are just as likely to reflect poor quality products as high quality products such that a count of searches will not automatically reveal which is the relevant situation.

Reliability—One of the most important characteristics of marketing research is that is reliable. Research done today should yield the same result as research done tomorrow or a month from tomorrow. By incorporating the process of sampling, the present system 100 will ensure that clients 50a . . . 50n obtain reliable results. Clients will know that if their results change drastically on one particular day that the difference is due to an actual change in the perception of their brand, and not due to a change in where the sentiments came from.

Validity—Data quality is typically a top of mind issue for marketing researchers. It is pointless to gather data if that data does not actually measure what was intended to be measured. Because the present system 100 includes a sentiment identification process 110 that incorporates inclusion and exclusion words, the present system 100 will be certain to have a high level of brand validity. In addition, the construct engine 120 is continually being fine-tuned to ensure the highest level of quality in assigning sentiments to categories.

While this invention has been particularly shown and described with references to example embodiments thereof, it will be understood by those skilled in the art that various changes in form and details may be made therein without departing from the scope of the invention encompassed by the appended claims.

For example, the present invention may be implemented in a variety of computer architectures. The computer network shown in the figures are for purposes of illustration and not limitation of the present invention.

The invention can take the form of an entirely hardware embodiment, an entirely software embodiment or an embodiment containing both hardware and software elements. In one example preferred embodiment, the invention is implemented in software, which may be implemented using one or more of the following: web based interfaces, engines, crawlers, virtual machines, applets, databases, resident software, firmware, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Some examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code are retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

APPENDIX I

List of Example Constructs

| name | description |
| --- | --- |
| 3D | Verbatims talking about 3D products |
| 3D Movies | Verbatims mentioning three dimensional movies |
| 3D TV | Verbatims mentioning three dimensional television |

APPENDIX I-continued

List of Example Constructs

| name | description |
|---|---|
| Accessories | Accessories component of the Product category related to accessories and accessorizing |
| Acting | Verbatims talking about acting |
| Acting Celebrities | Verbatims mentioning acting celebrities including Al Pacino, Audrey Hepburn, and Johnny Depp |
| Adults | Verbatims mentioning adults, parents, and older people |
| Africa | Africa component of the Global Association category related to Verbatims mentioning countries in Africa |
| Age | Verbatims mentioning age |
| Aggregate Around the House | An aggregate measure of all Around the House constructs |
| Aggregate Attire | An aggregate measure of all Verbatims mentioning attire |
| Aggregate Brands | An aggregate measure of all Verbatims mentioning brand names |
| Aggregate Charity | Verbatims mentioning donations, volunteering and charities |
| Aggregate Electronics | A variety of Electronics products such as televisions, video games, and cell phones |
| Aggregate Emotions | An aggregate measure of all Verbatims mentioning emotions |
| Aggregate Events | An aggregate measure of all Verbatims mentioning social events |
| Aggregate Experience | Verbatims mentioning the physical experience of the store |
| Aggregate Famous People | Verbatims mentioning people famous for politics, sports, entertain, and other industries |
| Aggregate Food | An aggregate measure of all Verbatims mentioning food |
| Aggregate GG | An aggregate measure of all Verbatims mentioning the Golden Globes |
| Aggregate Global | Verbatims mentioning countries around the world |
| Aggregate Health | An aggregate measure of all Verbatims mentioning health and safety |
| Aggregate Online Sites | An aggregate measure of Verbatims mentioning all online sites |
| Aggregate Outdoors | An aggregate measure of all Verbatims mentioning the outdoors |
| Aggregate Personality | A single measure for all personality characteristics |
| Aggregate Professions | An aggregate measure of all Verbatims mentioning professions |
| Aggregate Retailers | An aggregate measure of all Verbatims mentioning retailers |
| Aggregate Teams | Verbatims mentioning any sports teams |
| Agreeableness | Verbatims mentioning agreeableness ranging from cooperativeness to stubbornness |
| Air Creature | Air Creature component of the Outdoors category related to Verbatims mentioning birds |
| Airbags | Verbatims talking about airbags |
| Airlines | Airlines component of the Placement category related to Verbatims mentioning general and specific airlines |
| AlSiobhanMagnus | |
| AlTimUrban | |
| AlTodrick Hall | Verbatims mentioning Todrick Hall |
| ALBaseball Players | Verbatims mentioning current American League Baseball players |
| Alcohol Brands | Verbatims mentioning specific brands of alcohol like Chivas Regal, Jose Cuervo and Skyy |
| Alcohol Types | Alcohol component of Food and Beverage category related to alcoholic beverages such as beer, wine, or liquor |
| Alpha | Verbatims mentioning Alpha |
| Alpine skiing | Verbatims mentioning the sport of alpine skiing |
| America | America component of Global Associations category related to American states and Americanisms |
| American Coverage | Verbatims talking about television coverage from the US |
| American Holidays | Verbatims mentioning America-specific holidays including April Fools Day, Columbus day and Memorial Day |
| Amusement Parks | Verbatims mentioning fairs, amusement parks and carnivals |
| Analog | Verbatims mentioning analog |
| Anger | Anger component of the basic human emotions related to feelings of rage and anger. NOTE: Higher top box and average scores mean happier, more positive feelings. |
| Animated Television Shows | Discussion related to animated television shows like The Family Guy, Naruto and The Simpsons |
| Anthem | Verbatims mentioning the national anthem |
| Anticipation | Anticipation component of the basic human emotions related to feelings of expectations, hope, and looking forward |
| Apple | Verbatims mentioning apple |
| Apple Pie | Verbatims mentioning apple pie |
| Appliance Brands | Verbatims mentioning appliance brands like Cuisinart, Whirlpool and GE |
| Appreciation | Appreciation component of the basic human emotions related to feelings ranging from great appreciation to great revulsion |
| Armed Forces | Armed Forces component of the Professions category related to soldiers, |
| Artists | Verbatims mentioning traditional and contemporary artists |
| Artists1 | Verbatims mentioning famous traditional and contemporary artists |
| Artists2 | Feeder for total artists |

APPENDIX I-continued

List of Example Constructs

| name | description |
| --- | --- |
| Artwork | Verbatims mentioning art such as painting, drawing, and airbrushing |
| Asia | Asia component of the Global Association category related to Verbatims mentioning countries in Asia |
| Asian Food | Verbatims mentioning Asian food |
| Athletic Professions | Verbatims mentioning athletic professions such as coach or umpire |
| Athletic Shoe Brands | Athletic Shoe Brands component of Footwear Brands relating to brands like Nike, Adidas or Puma |
| Audience | Verbatims mentioning audiences or spectators |
| Audio System | Verbatims mentioning receivers, shelf systems and turntables |
| Audio System Brands | Verbatims mentioning audio system brands like Bose, Yamaha and Panasonic |
| Authors | Verbatims mentioning Authors including Agatha Christie, Dr Seuss, JK Rowling |
| Auto Servicing | Verbatims mentioning servicing automobiles |
| Automobile Brands | Verbatims mentioning automobile brands like Jaguar, Toyota and Ford |
| Automotive Stores | Automotive Stores component of the Placement category related to Verbatims mentioning general and specific automotive and parts stores |
| Availability | Verbatims mentioning availability, or being in stock |
| Awards | Verbatims mentioning awards, medals and trophies |
| Awareness | Verbatims mentioning awareness or having 'heard of' something |
| Babies | Babies component of the People Association category related to Verbatims mentioning newborns, infants, or babies |
| Baby Stores | Baby Stores component of the Placement category related to general and specific baby stores |
| Backyard | Backyard component of the Around the House category related to Verbatims mentioning items such as balconies, gardens, or patios |
| Bacon | Verbatims mentioning bacon |
| Bagels | Verbatims mentioning Bagels |
| Bailouts | Verbatims mentioning bailouts or government financial assistance |
| Baked | Verbatims mentioning baked |
| Baked Potato | Verbatims mentioning baked potatos |
| Bargaining | Verbatims mentioning bargaining, haggling or negotiating terms of sale |
| Baseball Category | Verbatims mentioning aspects of baseball |
| Baseball Celebrities | Verbatims mentioning baseball celebrities like Jason Giambi, Joe DiMaggio and Babe Ruth |
| Basement | Verbatims mentioning things in the basement such as furnaces, plumbing, or washing machines |
| Basketball Celebrities | Verbatims mentioning basketball celebrities like Michael Jordan, Kobe Bryant and Larry Bird |
| Bathroom | Bathroom component of the Around the House category related to Verbatims mentioning toothpaste, toilets or towels |
| Batteries | Verbatims mentioning batteries |
| BBQ | Verbatims mentioning grape flavors |
| BDPS300 | Verbatims mentioning the BDPS300 |
| Beauty Stores | Beauty stores component of the Placement category related to general and specific beauty stores |
| Bebo | Verbatims mentioning Bebo, the social network |
| Bedroom | Verbatims mentioning components of a bedroom such as bed, dorm room, or sheets |
| Beer Brands | Verbatims mentioning beers like Corona, Budweiser and Miller |
| Benefits | Verbatims mentioning employee benefits |
| Berry | Verbatims mentioning berry flavor |
| BestBuy | Verbatims mentioning Best Buy |
| Beverage Types | Verbatims mentioning types of non-alcoholic beverages such as pop, tea, or milk |
| Biathlon | Verbatims mentioning the sport of biathlon |
| Big Business | Verbatims talking about huge companies |
| Birthday | Verbatims mentioning birthdays |
| Biscuits | Verbatims mentioning biscuits |
| Black and white | Verbatims mentioning lens hood |
| Black Entertainment Television Shows | Verbatims mentioning black entertainment television shows like 106 and Park, Access Granted and The Wendy Williams Show |
| Blogger | Verbatims mentioning Blogger and Blogspot |
| Blogging Sites | Verbatims mentioning specific blogging sites |
| Blogs | Blogs component of Literature category relating to Verbatims mentioning blogs and blogging |
| Bluetooth | Verbatims mentioning bluetooth |
| Blu-ray Player | Verbatims mentioning Blu-Ray players |
| Blyth Academy | Verbatims mentioning Blyth Academy, first high school in the world to supply Sony Readers to its full time students in place of printed textbooks |
| Bobsleigh | Verbatims mentioning the sport of bobsleigh |
| Body Art | Body Art component of Personal Beauty category relating to Verbatims mentioning earrings, body piercings, and tattoos |

APPENDIX I-continued

List of Example Constructs

| name | description |
|---|---|
| Body Parts | Verbatims mentioning body parts like eyes, stomach and legs |
| Bodycare products | Body care component of Personal Beauty category relating to Verbatims mentioning body products like body wash lotion and sunscreen |
| Book Stores | Book Stores component of the Placement category related to general and specific book stores |
| Bottoms | Bottoms component of the Attire category related to Verbatims mentioning pants, skirts, or shorts |
| Boxing Celebrities | Verbatims mentioning boxing celebrities like Muhammad Ali, Mike Tyson and Ricky Hatton |
| Brakes | Verbatims related to brakes |
| Bravia | Verbatims mentioning Bravia |
| Breads | Verbatims mentioning grain products including bread and wheat |
| Breakfast | Discussion related to eating in the morning |
| Breakfast Burrito | Verbatims mentioning breakfast burritos |
| Breakfast Items | Verbatims mentioning food items served for breakfast like eggs, cereal and pancakes |
| Breakfast Sandwich | Verbatims mentioning breakfast sandwiches |
| Browsers | Verbatims mentioning internet browsers like IE, Firefox and Google Chrome. |
| Brunch | Brunch component of the Food and Beverage category related to meals that replace breakfast and lunch |
| Buffalo Wings | Verbatims mentioning buffalo wings |
| Burrito | Verbatims mentioning burritos |
| Business Operations | Verbatims mentioning business dealings such as the economy, markets, earnings |
| Cafe | Verbatims mentioning cafes |
| Cafeteria | Verbatims mentioning cafeterias |
| Cake | Verbatims mentioning cake, excluding funnel cake |
| Camcorders | Verbatims mentioning video cameras |
| Camcorder Brands | Verbatims mentioning camcorder brands like JVC, Canon and Coby |
| Camera | Verbatims mentioning camera and camera equipment |
| Camera Brands | Verbatims mentioning camera brands like Nikon, Canon and Sony |
| Camping | A variety of camping products such as tents, coolers, and flashlights |
| Canada | Canada component of Global Associations category related to mentioning provinces, territories and other Canadianisms |
| Canadian Coverage | Verbatims talking about television coverage from Canada |
| Canadian Holidays | Verbatims mentioning Canada-specific holidays including Victoria Day, Boxing Day and Remembrance Day |
| Candy Brands | Verbatims mentioning specific candy products like Kit Kat, Skittles and Juicy Fruit |
| Car | Verbatims mentioning cars, automobiles or limousines |
| Car Racing Celebrities | Verbatims mentioning car racing celebrities like Darrel Waltrip, Kyle Petty and Joey Logano |
| Carbonation | Verbatims mentioning carbonation of beverages |
| Carmel | Verbatims mentioning carmel |
| Cartoon Characters | Verbatims mentioning cartoon characters such as Batman, Bart Simpson, Toucan Sam |
| Casual Dining | Casual Dining component of the Placement category related to Verbatims mentioning general and specific restaurants |
| Casual Dining QSR | Verbatims mentioning casual dining |
| CD Drive | Verbatims mentioning CD drives |
| CDs, DVDs, and Games | Verbatims mentioning CDs and DVDs, and video games |
| Celebrations | Verbatims mentioning celebrations like birthdays, anniversaries and weddings |
| Celebrities - Italian | Verbatims mentioning famous Italian people |
| Cell phone Brands | Verbatims mentioning cell phone brands like Nokia, Blackberry and LG |
| Censorship | Verbatims mentioning censorship, banning and prohibiting |
| Cereal Brands | Verbatims mentioning specific breakfast cereals |
| CFL Teams | Verbatims mentioning Canadian Football League teams |
| Charities | Discussions mentioning charities |
| Checkout Line | Verbatims mentioning waiting in check out lines. NOTE: Higher top box and average scores mean happier, more positive feelings. |
| Cheese | Verbatims mentioning cheese |
| Cheese - Fresh | Verbatims mentioning types of fresh cheese |
| Cheese - Hard | Verbatims mentioning types of hard cheese |
| Cheese - Parmesan | Verbatims mentioning parmesan cheese |
| Cheese - Semi-soft | Verbatims mentioning types of semi-soft cheese |
| Cheese - Soft-Ripened | Verbatims mentioning types of soft ripened cheese |
| Cheese Textures | Verbatims mentioning the texture or feel of cheese |
| Cheese Types | Verbatims mentioning types of cheese such as fresh or hard |
| Cheeseburger | Verbatims mentioning cheeseburgers |
| Cherry | Verbatims mentioning cherry flavors |
| Chew Tobacco | Verbatims talking about chewing tobacco |
| Chicken | Verbatims mentioning specific chicken items like strips, popcorn and nuggets, excluding chicken burgers |

APPENDIX I-continued

List of Example Constructs

| name | description |
|---|---|
| Chicken Burger | Verbatims mentioning chicken burgers |
| Chicken Nuggets | Verbatims mentioning chicken nuggets |
| Chicken Wings | Verbatims mentioning chicken wings |
| Childcare | Verbatims mentioning childcare, babysitting and watching over children |
| Children | Children component of the People Association category related to Verbatims mentioning small children, tots, or toddlers |
| Chili | Verbatims mentioning chili |
| Chocolate | Verbatims mentioning chocolate |
| Chocolate Shavings | Verbatims mentioning chocolate shavings |
| Choice | Choice component of the Product category related to choices, alternatives and options |
| Cinnamon | Verbatims mentioning cinnamon |
| Classical Musicians | Verbatims mentioning classical musicians like Beethoven, Vivaldi and Mozart |
| Cleanliness | Cleanliness component of the Physical Descriptors category related to being clean or dirty |
| Clothing Accessories | Verbatims mentioning extraneous clothing such as hats, hosiery, or purses |
| Clothing Brands | Verbatims mentioning clothing brands like Abercrombie, Ralph Lauren and Guess |
| Clothing Stores | Clothing Stores component of the Placement category related to general and specific clothing stores |
| Clubs | Clubs component of the People Associations category related to clubs and gangs |
| Coffee - Ice | Verbatims mentioning iced coffee |
| Coffee Shops | Verbatims mentioning coffee shops |
| Coffee Toppings | Verbatims mentioning toppings for coffee such as whipped cream or cinnamon |
| Coke vs Pepsi | Verbatims specifically mentioning a comparison of Coke and Pepsi |
| Cold temperature | Cold Temperature component of the Physical Descriptors category related to being cold, frozen, or chilly |
| Color | Verbatims mentioning colors such as red, blue, and green |
| Comedy Television Shows | Verbatims mentioning comedy television shows like How I Met Your Mother, The Office and The Big Bang Theory |
| Commissions | Commissions component of the Pricing category related to getting commissions or sharing in profits |
| Community | Verbatims mentioning community involvement |
| Compatibility | Compatibility component of the Product category related to a product's compatibility with another product |
| Computer Brands | Verbatims mentioning computer brands like HP, Gateway and |
| Computer Hardware | Verbatims mentioning general and brand-specific keyboards, drivers or printers |
| Computer Software | Verbatims mentioning general and brand-specific softwares |
| Computer Tasks | Verbatims mentioning file sharing, creating presentations or installing |
| Computer Types | Verbatims mentioning general and brand-specific computer hardware and software |
| Conscientiousness | Verbatims mentioning conscientiousness ranging from responsibility to neglect |
| Contests | Verbatims mentioning contests, draws, and sweepstakes |
| Control Devices | Verbatims mentioning control devices such as keyboards and mice |
| Cookies | Verbatims mentioning cookies |
| Cosmetic Surgery | Cosmetic Surgery component of Personal Beauty relating to Verbatims mentioning cosmetic procedures such as facelifts or botox |
| Country Artists | Verbatims mentioning country artists like Johnny Cash, Keith Urban and Leann Rimes |
| Courage | Courage component of the basic human emotions related to feelings of courage, anxiety, and cowardice. NOTE: Higher top box and average scores mean happier, more positive feelings. |
| CPU Manufacturers | Verbatims mentioning CPU manufacturers like Intel, AMD and IBM |
| Crash Testing | Verbatims related to crash testing |
| Cream | Verbatims mentioning cream |
| Creativity | Verbatims mentioning creativity ranging from being artistic to lack of imagination |
| Credit Cards | Verbatims mentioning Credit Cards such as Visa, MasterCard or American Express |
| Cross Country Ski | Verbatims mentioning the sport of cross country skiing |
| Crowding | Verbatims mentioning a place being busy, packed, or crowded with people. NOTE: Higher top box and average scores mean happier, more positive feelings. |
| CTV | Verbatims mentioning the CTV television station |
| Curling | Verbatims mentioning the sport of curling |
| CV Purchasing | For testing the validity of the construct Purchasing |
| Cybershot | Verbatims mentioning Cybershot |
| Dairy | Verbatims mentioning dairy products such as milk, yogurt and cheese |
| Dancing | Verbatims talking about dancing |

APPENDIX I-continued

List of Example Constructs

| name | description |
|---|---|
| Database Software | Verbatims mentioning database softwares such as MySQL, MS SQL and Oracle |
| Dating | Dating component of the People Associations category related to romantic relationships |
| Day | Verbatims mentioning the days of the week |
| Death | Death component of the Health and Safety category related to death and dying |
| Debit Cards | Verbatims mentioning Debit Cards |
| Debt and Owing | Verbatims mentioning being in debt and owing money |
| Decaf | Verbatims mentioning decaf |
| Delivery | Verbatims mentioning delivery of food or items |
| Democrat | Verbatims mentioning the Democrat political orientation |
| Department Stores | Department Stores component of the Placement category related to general and specific department stores |
| Designer Brands | Verbatims mentioning designer brands like Louis Vuitton, Valentino and Ralph Lauren |
| Designer Shoe Brands | Designer Shoe Brands component of Footwear Brands relating to brands like Louboutin, Jimmy Choo or Manolo Blahnik |
| Desktop Operating Systems | Discussions relating to desktop OS such as Windows, Mac and Linux |
| Desserts | Verbatims mentioning desserts and sweets such as cake and cookies |
| Destinations | Verbatims mentioning going somewhere |
| Determination | Verbatims mentioning determination ranging from being motivated to being uninspired |
| Diet | Verbatims mentioning diet |
| Digital Zoom | Verbatims mentioning digital zoom |
| Diner | Verbatims mentioning diners |
| Dining Out | Verbatims mentioning dining out |
| Discount Stores | Discount Stores component of the Placement category related to general and specific discount stores |
| Discrimination | Verbatims mentioning discrimination, whether racial, gender, sexual, or other. Please be respectful. |
| Distance | Distance component of the Physical Descriptors category related to closeness or farness. |
| Docking Station | Verbatims mentioning docking stations |
| Dollar Stores | Dollar stores component of the Placement category related to general and specific dollar stores |
| Donations | Donations component of the Business category related making donations in the form of money or items |
| Donuts | Verbatims mentioning donuts |
| Door Handle | Verbatims related to door handles |
| Downloading | Verbatims mentioning downloading |
| Drama Television Shows | Verbatims mentioning drama television shows like House, Dexter and Heroes |
| Drinking | Verbatims mentioning drinking any type of beverage |
| Drive Thru | Drive Thru component of the Retailer Characteristic category related to using services from within a vehicle |
| Durable | Verbatims mentioning the durability of things |
| DVD Drive | Verbatims mentioning DVD hardware components |
| Earphones | Verbatims mentioning earphones |
| Earthquakes | Verbatims mentioning earthquakes |
| Ease | Ease component of the Physical Descriptors category related to simplicity and effortlessness. |
| Easy Listening Artists | Verbatims mentioning easy listening artists like Barbara Streisand, Elton John and Jim Brickman |
| Eat at home | Verbatims mentioning eating at home |
| Eating | Eating component of the Food and Beverage category for Verbatims mentioning eating that don't necessarily mention a specific meal |
| Eating Disorder | Verbatims mentioning eating disorders |
| Eggs | Verbatims mentioning eggs |
| Electronics Stores | Electronic Stores component of the Placement category related to general and specific electronics stores |
| Eligibility | Verbatims mentioning eligibility ranging from getting approval or permission to being unworthy or unfit |
| Email Clients | Verbatims mentioning email clients such as hotmail or gmail |
| Emotional Stability | Verbatims mentioning emotional stability ranging from sanity to neuroticism |
| Employees | Verbatims mentioning staffing and new hires |
| Employment | Verbatims mentioning employment, working, and hiring |
| Energetic | Verbatims mentioning energetic ranging from being full of energy to being lazy |
| Engine | Verbatims related to engines |
| Enterprise Resource | Verbatims mentioning enterprise resource planning products like Sharepoint and SAP. |

APPENDIX I-continued

List of Example Constructs

| name | description |
|---|---|
| Entertainment Stores | Verbatims mentioning entertainment stores |
| Environmentally Friendly | Verbatims mentioning carbon footprint, sustainability, and being green |
| E-Reader Brands | Verbatims mentioning e-reader brands like Reader Touch, Kindle and Nook. |
| E-Reader Category | Verbatims mentioning the e-reader category |
| Error | Verbatims mentioning mistakes, blame, and gaffes. NOTE: Higher top box and average scores mean happier, more positive feelings. |
| Europe | Europe component of the Global Association category related to Verbatims mentioning countries in Europe |
| Exciting | Discussions or exciting ranging from interesting to boring |
| Expiry | Verbatims mentioning expiry dates |
| Express Checkout | Express Checkout component of Retailer Characteristics related to checkout lines meant for customers with few items |
| External Drive | Verbatims mentioning external drives |
| Eyebrows | Verbatims mentioning eyebrows |
| Eyecare and wear | Verbatims mentioning eye care and eyewear products such as sunglasses, glasses and contacts |
| Eyelashes | Verbatims mentioning eyelashes |
| Eyes | Verbatims mentioning eyes |
| Fabric | Verbatims mentioning fabric such as cotton, burlap, or denim |
| Facebook | Verbatims mentioning Facebook |
| Facial Hair | Verbatims mentioning facial hair such as moustaches and beards |
| Fashion Models | Verbatims mentioning fashion models like Heidi Klum, Adriana Lima and Jason Shaw |
| Fashion Police Hosts | Verbatims mentioning the hosts of the Fashion Police television show |
| Fashionable | Verbatims mentioning fashionable ranging from being popular to being outdated |
| Fast | Discussion related to quickness of speed |
| Fast food | Verbatims mentioning fast food |
| Fastfood Restaurants | Verbatims mentioning fast food restaurants like McDonald's, Subway and KFC. |
| Favorite | Favorite component of the Physical Descriptors category related to something being the best or prized thing |
| Feedback | Feedback component of the Product category related to getting and making comments, suggestions and evaluations |
| Feeding Babies | Verbatims talking about feeding, nursing or breastfeeding babies |
| Feeling ill | Feeling Ill component of Health and Safety category relating to minor illness, or feeling under the weather. NOTE: Higher top box and average scores mean happier, more positive feelings. |
| Female | Female component of the People Association category related to Verbatims mentioning females, ladies, or women |
| Feminine Hygiene | Feminine Hygiene component of Personal Beauty category related to feminine hygiene products like sanitary pad and tampon |
| Figure Skating | Verbatims mentioning the sport of figure skating |
| Financial Institutions | Financial Institution component of the Placement category related to general and specific banking and financial institutions |
| Financing | Verbatims mentioning financing and interest rates |
| Fine Dining | Verbatims mentioning fine dining |
| Fire Wire | Verbatims mentioning fire wires |
| Firewall | Verbatims mentioning firewalls |
| First Time | Verbatims mentioning the first time or last time |
| Fish | Verbatims mentioning fish |
| Fitness | Fitness component of Health and Safety category relating to calisthenics, exercise, or getting in shape |
| Fitting Room | Verbatims mentioning change rooms |
| Flash Video | Verbatims talking about Flash video or animation capabilities |
| Flickr | Verbatims mentioning Flickr |
| Food Brands | Verbatims mentioning specific food brands like Nestle, Kraft and Heinz |
| Food Preparations | Verbatims mentioning how food is prepared like fried, steamed and grilled |
| Football Celebrities | Verbatims mentioning football celebrities like Tom Brady, Math Roth and Peyton Manning |
| Footwear | Verbatims mentioning shoes, boots, or heels |
| Footwear Brands | Verbatims mentioning brand-specific footwear |
| Frappuccino | Verbatims mentioning frappuccinos |
| Freestyle ski | Verbatims mentioning the sport of freestyle skiing |
| French Fries | Verbatims mentioning french fries |
| French Toast | Verbatims mentioning french toast |
| Fresh Food | Verbatims mentioning fresh fruits and vegetables |
| Fried | Verbatims mentioning fried |
| Fried Potatos | Verbatims mentioning fried potatos |
| Froth | Verbatims mentioning froth |
| Fruits | Verbatims mentioning fruit including apples, kiwis, and apricots |
| Functionality | Functionality component of the Product category related to a product's functions and features |
| Fundraising | Verbatims mentioning raising funds or money |

APPENDIX I-continued

List of Example Constructs

| name | description |
| --- | --- |
| Funny | Verbatims mentioning the range of being humorous to being dramatic |
| Game Positions | Verbatims mentioning game positions like point guard, quarterback and pitcher |
| Gaming Console Brands | Verbatims mentioning video game consoles like PlayStation, Xbox and Wii. |
| Garage | Verbatims mentioning garages |
| Garbage | Verbatims mentioning garbage, junk, or rubble. NOTE: Higher top box and average scores mean happier, more positive feelings. |
| Generic | Generic component of the Physical Descriptors category related to store brands or private labels |
| Generosity | Verbatims mentioning generosity ranging from altruism to greed |
| Getting a License | Verbatims mentioning getting a license |
| Gift Cards | Gift cards component of the Product Category related to gift cards or gift certificates |
| Giveaways | Giveaways component of the Promotion category related to freebies, complimentary passes and samples |
| GM Reinvest | Verbatims mentioning Re:Invest |
| Golf Celebrities | Verbatims mentioning golf celebrities like Tiger Woods, Jack Nicklaus and Walter Hagen |
| GPS brands | Verbatims mentioning GPS brands like Garmin, TomTom and Magellan. |
| Grape | Verbatims mentioning grape flavors |
| Graphics Card | Verbatims mentioning Graphics Cards |
| Greasy | Verbatims mentioning things being or feeling greasy |
| Grilled | Verbatims mentioning grilled |
| Groceries | Verbatims mentioning grocery shopping |
| Grocery Stores | Grocery Stores component of the Placement category related to general and specific grocery stores |
| Hair Appearance | Verbatims mentioning the appearance of hair |
| Hair Care | Hair component of Personal Beauty category relating to Verbatims mentioning hair and hair care products like shampoo and conditioner |
| Ham | Verbatims mentioning ham |
| Hamburgers | Verbatims mentioning hamburgers, veggie, chicken, and other types of burgers |
| Handycam | Verbatims mentioning Handycam |
| Happiness | Happiness component of the basic human emotions related to feelings of joy, happiness, or delight |
| Happy Meal | Verbatims mentioning Happy Meals |
| Harddrive | Verbatims mentioning computer hard drives |
| Hash Browns | Verbatims mentioning hash browns |
| Hashtags | Verbatims mentioning Twitter hashtags |
| HD Bike Parts | Verbatims mentioning HD branded bike parts |
| HD Products | Verbatims mentioning HD products including jackets and jewelry |
| Health | Health component of the Professions category related to doctors, nurses and therapists. |
| Health Care | Verbatims mentioning health care such as first aid and checkups |
| Hearing Impairment | Verbatims mentioning hearing aids and hearing ability |
| Heavy | Heavy component of the Physical Descriptors category related to weight, obesity, and mass |
| hi5 | Verbatims mentioning hi5, the social network |
| High Def | Verbatims mentioning High Definition products |
| Hispanic | Verbatims mentioning Hispanics, Latinos, or Spanish people |
| Hoagies | Verbatims mentioning hoagies |
| Hobbies | Verbatims mentioning hobbies including bicycling, watching TV, or collecting stamps |
| Hockey | Verbatims mentioning hockey |
| Hockey Celebrities | Verbatims mentioning Hockey celebrities such as Wayne Gretzky, Don Cherry, and Bobby Orr |
| Holidays | Verbatims mentioning shared, religious and country-specific holidays |
| Home Building Stores | Home Building Stores component of the Placement category related to general and specific home building stores |
| Home Care | Home Care products including air fresheners, cleaners and detergents |
| Home Theatre | Verbatims mentioning home theatre |
| Home Theatre Brands | Verbatims mentioning home theatre brands like Sony, Samsung and Panasonic. |
| Homemade | Verbatims mentioning homemade |
| Honesty | Verbatims mentioning honesty ranging from truth to deception |
| Hot - Cappuccino | Verbatims mentioning cappuccino |
| Hot - Coffee | Verbatims mentioning coffee |
| Hot - Green Tea | Verbatims mentioning green tea |
| Hot - Tea | Verbatims mentioning tea |
| Hot Chocolate | Verbatims mentioning hot chocolate |
| Hot temperature | Hot Temperature component of the Physical Descriptors category related to hot, heated, and scorching |
| Hotdogs | Verbatims mentioning hot dogs |
| Hotels | Hotels component of the Placement category related to Verbatims mentioning general and specific hotels |

APPENDIX I-continued

List of Example Constructs

| name | description |
| --- | --- |
| Hours | Verbatims mentioning store hours |
| Housing | Verbatims mentioning housing, apartments, and real estate |
| How | How component of The W's category including any verbatim that includes the word "How" |
| Humility | Verbatims mentioning humility ranging from modesty to arrogance |
| Hunger | Verbatims mentioning being hungry |
| Hurricane | Verbatims mentioning hurricanes |
| Husbands and Boyfriends | Verbatims mentioning husbands and boyfriends |
| Hygiene | Verbatims mentioning personal hygiene including taking showers, using deodorant, or brushing teeth |
| Ice Cream | Verbatims mentioning ice cream |
| Illegal Drugs | Illegal Drugs component of Health and Safety category relating to illegal drugs such as cocaine or marijuana. NOTE: Higher top box and average scores mean happier, more positive feelings. |
| Image Stabilization | Verbatims mentioning image stabilization |
| Important Americans | Verbatims mentioning important Americans including Albert Einstein, Benjamin Spock, and Ralph Nader |
| In Out of Stock | Verbatims mentioning products being in or out of stock, or discontinued |
| Income | Verbatims mentioning salaries, wages, and wealth |
| Infamous and Otherwise | Verbatims mentioning people whose names are well known |
| Inferred Youth | Discussions likely made by youth |
| Influential People | Verbatims mentioning influential people including Al Gore, Oprah, and Bill Gates |
| Innovation | Innovation component of the Product category related to Verbatims mentioning introducing something new |
| Insurance | Verbatims mentioning insurance |
| Intelligence | Verbatims mentioning intelligence ranging from being smart to being dense |
| Interest rates | Verbatims mentioning interest rates |
| Internet Jargon | Verbatims mentioning jargon such as bing, 2.0, and chkdsk |
| Investments | Verbatims mentioning investments such as stocks, bonds, or ownerships |
| Italian Food | Verbatims mentioning Italian food |
| iTampon | Verbatims mentioning iTampon in response to the iPad |
| Javascript | Verbatims mentioning Javascript |
| JaysAttend | Verbatims mentioning attendance of games |
| JaysBall | Verbatims mentioning catching a ball |
| JaysBooJays | Verbatims using the slang BooJays |
| JaysBranded | Verbatims mentioning Jays branded items |
| JaysHope | Verbatims talking about pride and hope for the future |
| JaysJaysCare | Verbatims mentioning the Jays Care foundation and its programs |
| JaysOwners | Verbatims mentioning owners and ownership |
| JaysRogers | Verbatims mentioning the Rogers Centre |
| JaysRoster | Verbatims mentioning the current players of the Blue Jays |
| JaysSigning | Verbatims mentioning signing |
| Jazz Artists | Verbatims mentioning jazz artists like John Coltrane, Ella Fitzgerald and Duke Ellington |
| Jewelry | Jewelry component of the Attire category related to Verbatims mentioning necklaces, watches, or earrings |
| Jewelry Stores | Jewelry Stores component of the Placement category related to Verbatims mentioning general and specific jewelry stores |
| Job Loss | Job Loss category of the Product component related to cutting and losing jobs |
| Justice | Discussion related to judicial processes, being treated fairly, and being punished appropriately |
| Ketchup | Verbatims mentioning ketchup |
| Keyboard | Verbatims mentioning keyboards |
| Kids Meals | Verbatims mentioning Kids Meals |
| Kindness | Verbatims mentioning the range of kindness to cruelness |
| Kitchen | Verbatims mentioning small appliances, cooking utensils or baking implements |
| Kitchen Items | Verbatims mentioning kitchen items such as blenders, toasters, and silverware |
| KitchenQSR | Verbatims mentioning Kitchen |
| Land Creature | Land Creature component of Outdoors category related to animals that live mainly on the land such as cows, monkeys or alligators |
| Laptop Brands | Verbatims mentioning models of laptops like VAIO, HP Pavillion and Dell XPS. |
| Large | Large component of Physical Descriptor related to large sizes or spaciousness |
| Latte | Verbatims mentioning lattes |
| Leadership Roles | Verbatims mentioning executive offices such as administration, CEO, and chairpersons |

APPENDIX I-continued

List of Example Constructs

| name | description |
| --- | --- |
| Learn to Drive | Verbatims mentioning learning to drive or ride |
| Legendary Actors | Verbatims mentioning legendary actors like Humphrey Bogart, Marlon Brando and James Dean |
| Legendary Actresses | Discussion related to legendary actresses like Audrey Hepburn, Bette Davis and Elizabeth Taylor |
| Lens Hood | Verbatims mentioning lens hood |
| Lightweight | Discussion related to things weighing little |
| Livejournal | Verbatims mentioning Livejournal, the blogging website |
| Living room | Verbatims mentioning living room features such as coffee tables, couches, or fireplaces |
| Lobster | Verbatims mentioning lobster |
| Long | Verbatims mentioning being long, drawn out, or lengthy |
| Low Calorie | Verbatims mentioning low calorie |
| Low Fat | Verbatims mentioning low fat |
| Low Sodium | Verbatims mentioning low sodium |
| Low Sugar | Verbatims mentioning low sugar |
| Loyalty | Verbatims mentioning memberships, loyalty clubs, points and rewards |
| Luge | Verbatims mentioning the sport of luge |
| Lunch | Verbatims mentioning lunch or eating in the midday |
| Luxury | Verbatims mentioning luxury or premium items |
| Mac'n Cheese | Verbatims mentioning macaroni and cheese |
| Magazines | Magazines component of Literature category relating to Verbatims mentioning specific magazines |
| Mail Server | Verbatims mentioning mail servers |
| Maintenance | Maintenance component of the Professions category related to maintenance workers, mechanics and repairers |
| Makeup Brands | Makeup Brand component of Personal Beauty category related to Verbatims mentioning makeup brands like MAC, Nars and Clinique |
| Makeup Eye | Eye component of the Personal Beauty category related to Verbatims mentioning eye makeup like eyeliner and eye shadow |
| Makeup Face | Face component of the Personal Beauty category related to Verbatims mentioning face makeup like concealer and foundation |
| Makeup Lip | Verbatims mentioning lip makeup such as lipstick or lip pencils |
| Male | Verbatims mentioning males, men, or boys |
| Management | Management component of the Professions category related to managers, executives and administrators |
| Market Research | Verbatims talking about market research |
| Marriage | Verbatims mentioning marriage and weddings |
| Mashed Potatos | Verbatims mentioning mashed potatos |
| Mathematics | Verbatims mentioning mathematics, and mathematical functions |
| Mayo | Verbatims mentioning mayonnaise |
| Meat | Verbatims mentioning meat products including beef, poultry, and fish |
| Mechanical Hardware | Mechanical Hardware component of Retail Aisles category related to products such as hammers, drills, and saws |
| Media | Media component of the Professions category related to entertainers, directors or journalists |
| Medical Implements | Verbatims mentioning medical implements such as aspirators, thermometers and needles |
| Medical Procedures | Medical Procedures category of the Health and Safety construct related to surgeries, therapies and treatments. |
| Medicines | Medicines component of Health and Safety category relating to OTC or prescription medications |
| Memory | Verbatims mentioning computer memory |
| Mental Diseases | Mental Diseases component of the Health and Safety category related to mental or psychological problems and illnesses |
| Mesquite | Verbatims mentioning mesquite |
| Metacafe | Verbatims mentioning Metacafe, the video sharing website |
| Metal | Verbatims mentioning metal such as chrome, aluminum or steel |
| Mexican Food | Verbatims mentioning Mexican food |
| Middle East | Middle East component of the Global Association category related to Verbatims mentioning countries in the Middle East |
| Mileage | Verbatims talking about mileage |
| Military and War | Verbatims mentioning military groups, and war implements |
| Milkshake | Verbatims mentioning milkshakes |
| Minor BB Teams | Verbatims mentioning minor league baseball teams |
| MLB Players | Verbatims mentioning current Major League Baseball Players |
| MLB Teams | Verbatims mentioning Major League Baseball teams like Boston Red Sox, Toronto Blue Jays and New York Yankees |
| MLS Teams | Verbatims mentioning Major League Soccer teams |
| MMA Celebrities | Verbatims mentioning mixed martial arts celebrities like Chuck Lidell, Matt Hughes and Anderson Silva |
| Modems | Verbatims mentioning modems |
| Mom Made | Verbatims mentioning Mom Made |
| Monitor | Verbatims mentioning computer monitors |
| Month | Verbatims mentioning months |
| Mortgages | Verbatims mentioning mortgages |

APPENDIX I-continued

List of Example Constructs

| name | description |
|---|---|
| Motorcycles | Verbatims mentioning motorbikes and motorcycles |
| Mouse | Verbatims mentioning computer mice |
| MP3 Player Brands | Verbatims mentioning mp3 players like iPod, Zune and Walkman |
| Mushrooms | Verbatims mentioning mushrooms |
| Music Celebrities | Verbatims mentioning music celebrities from different music genres. Examples include Mozart, Beach Boys, and Coldplay |
| Music Player | Verbatims mentioning music players like cd player and mp3 player |
| Musical Instruments | Musical instruments such as violins and pianos, and types of music such as voice, jazz and rock and roll |
| Mustard | Verbatims mentioning mustard |
| Myspace | Verbatims mentioning Myspace |
| Mysterious | Verbatims mentioning something being hidden, enigmatic or mystical |
| Nachos | Verbatims mentioning nachos |
| Nail Care | Nail component of the Personal Beauty category related to Verbatims mentioning fingernail care |
| Narrow | Narrow component of the Physical Descriptors category related to being narrow, thin, or tapered |
| Natural | Natural component of the Physical Descriptors category related to things being genuine, organic or phony |
| Natural Disasters | Verbatims mentioning disasters such as flooding, tornados, or volcanos |
| NaturalFood | Verbatims mentioning natural |
| NBA Players | Verbatims mentioning current NBA players |
| NBA Teams | Verbatims mentioning NBA teams like LA Lakers, Miami Heat and Denver Nuggets |
| NBC | Verbatims mentioning the NBC television station |
| Need | Verbatims mentioning needs, drives and longings |
| New Actors | Verbatims mentioning new actors like Zac Efron, Robert Pattinson and Shia LaBeouf |
| New Actresses | Verbatims mentioning new actresses like Miley Cyrus, Hayden Panettiere and Rachel McAdams |
| New Different | Verbatims mentioning something being new or different |
| Newspapers | Newspapers component of Literature category relating to Verbatims mentioning major American newspapers like The New York Times, USA Today, or Chicago Tribune |
| NewYearsResolutions | Verbatims mentioning New Year's Resolutions |
| NFL Coaches | Discussions on NFL coaches |
| NFL Players | Verbatims mentioning NFL players like Donovan McNabb, Brett Favre and Ben Roethlisberger |
| NFL Prospects | Verbatims mentioning potential NFL players for 2010 |
| NFL Teams | Verbatims mentioning National Football League teams like New York Giants, Dallas Cowboys and San Francisco 49ers |
| NHL Players | Verbatims mentioning current National Hockey League players |
| NHL Players1 | Verbatims mentioning current National Hockey League players (Part 1) |
| NHL Players2 | Verbatims mentioning current National Hockey League players (Part 2) |
| NHL Teams | Verbatims mentioning National Hockey League teams |
| Ning | Verbatims mentioning Ning |
| NLBaseball Players | Verbatims mentioning current National League Baseball players |
| No Calories | Verbatims mentioning no calories |
| No Fat | Verbatims mentioning no fat |
| No Sodium | Verbatims mentioning no sodium |
| No Sugar | Verbatims mentioning no sugar |
| Non-Alcoholic Beverage Brands | Verbatims mentioning non-alcoholic beverage brands like Coke, Tropicana and Nescafe |
| Nordic Combined | Verbatims mentioning the sport of nordic combined |
| North America | North America component of the Global Associations category related to countries in North America, excluding the USA and Canada |
| Numberpads | Verbatims mentioning numberpads |
| Nutritional Information | Verbatims mentioning nutritional information |
| ObamaEconomy | Verbatims mentioning the economy |
| ObamaEnvironment | Verbatims mentioning the environment |
| ObamaGitmo | Verbatims mentioning Gitmo |
| ObamaHealth | Verbatims mentioning health care |
| ObamaIraq | Verbatims mentioning Iraq |
| ObamaMovie | Verbatims mentioning the HBO movie |
| ObamaNobel | Verbatims mentioning the Nobel prize |
| Oceanic | Verbatims mentioning Australia and New Zealand areas |
| Office | Office component of the Around the House category related to Verbatims mentioning cubicles, white boards, or desks |
| Office Software | Verbatims mentioning office softwares such as MS Office, iWork and OpenOffice |
| Office Support | Office Support component of the Professions category related to occupations such as receptionists, clerks and secretaries |
| OLOlympic Flame | Verbatims mentioning the Olympic flame |
| OLOpeningCer | Verbatims mentioning the opening ceremonies |
| Olympics | Verbatims mentioning the Olympics |
| Onion Ring | Verbatims mentioning onion rings and blooming onions |

APPENDIX I-continued

List of Example Constructs

| name | description |
|---|---|
| Onions | Verbatims mentioning onions |
| Online Ads | Online Ads component of the Promotion category related to advertisements in the web |
| Open late | Verbatims mentioning late night or overnight |
| Optical Drive | Verbatims mentioning optical drives |
| Optical Zoom | Verbatims mentioning optical zoom |
| Orange | Verbatims mentioning orange flavors |
| Ordering | Verbatims mentioning making and taking orders whether in person, online or some other format |
| Organic | Verbatims mentioning organic |
| Organizations | Organizations component of the People Associations category related to organizations, institutions and associations |
| OscarPresenter | Verbatims mentioning presenters or hosts |
| OscarSpeech | Verbatims mentioning acceptance speeches |
| Other Sides | Discussions mentioning side dishes other than fries and salads |
| Overweight | Verbatims mentioning someone being overweight |
| Pacific | Pacific component of the Global Associations category related to Verbatims mentioning countries in the Pacific |
| Packaging | Packaging component of the Product category related to a product's packaging |
| Pancakes | Verbatims mentioning pancakes |
| Parking | Verbatims mentioning the parking of vehicles |
| Parody | Discussions mentioning parodies, spoofs, or pranks |
| Pasta | Verbatims mentioning pasta |
| Patriotism | Verbatims mentioning patriotism, including national anthems and flags |
| Pay Packages | Verbatims mentioning bonuses, pay packages or pay deals |
| Payment Methods | Payment Methods component of the Pricing category related to paying cash, using credit cards and leasing |
| Peace | Verbatims mentioning peace, benevolence and pacification |
| Peanuts | Verbatims mentioning peanuts |
| Pepperoni | Verbatims mentioning pepperoni |
| Personal Selling | Personal Selling component of the Promotion category related to sales presentations and demos |
| Pet Stores | Pet Stores component of the Placement category related to Verbatims mentioning general and specific pet stores |
| Pets | Pets component of the People Association category related to Verbatims mentioning common house pets including dogs, cats, or birds |
| Pharmacies | Pharmacies component of the Placement category related to Verbatims mentioning general and specific pharmacies and drug stores |
| Philly Steak | Verbatims mentioning Philly Steak |
| Phobias | Verbatims mentioning specific phobias and fears |
| Phone Apps | Verbatims mentioning cell phone applications |
| Phone Providers | Verbatims mentioning phone providers like Verizon, Rogers and AT&T |
| Phone Signal | Verbatims mentioning phone signal |
| Photo Sharing | Verbatims mentioning online photo sharing sites such as Flickr or Twitpic |
| Photobucket | Verbatims mentioning photo bucket, a photo sharing website |
| Photography | Verbatims mentioning taking pictures, printing photographs or developing negatives |
| Physical Diseases | Physical Diseases component of Health and Safety category relating to bodily diseases, syndromes, and severe illnesses. NOTE: Higher top box and average scores mean happier, more positive feelings. |
| Physical Harm | Physical Harm component of Health and Safety category relating to robbery, assaults, or violence |
| Physical Pain | Verbatims mentioning sources of physical pain such as cuts, wounds and sprains. |
| Physical Safety | Physical Safety component of Health and Safety categories relating to being safe and protected |
| Pickles | Verbatims mentioning pickles |
| Pie-Savoury | Verbatims mentioning different types of non-dessert pies |
| Pie-Sweet | Verbatims mentioning different types of dessert pies |
| Pizza | Verbatims mentioning different types of pizza |
| Place in Order | Verbatims mentioning an order such as 1st or fifth |
| Placement | Placement component of the 4P marketing mix including the type of stores or machines where the product is purchased |
| Plant Life | Plant Life component of the Outdoors category related to plant life such as trees, bushes, or flowers |
| Plastic | Verbatims mentioning types of plastic |
| Politics | Verbatims mentioning political offices and procedures |
| Pop Artists | Verbatims mentioning pop artists like Justin Timberlake, Kate Perry and Lady Gaga |
| Popular Celebrities | Verbatims mentioning celebrities not associated with sports, music, or acting |
| Popular Conventions | Verbatims mentioning specific conventions |
| Pork Chops | Verbatims mentioning Pork Chops |

APPENDIX I-continued

List of Example Constructs

| name | description |
| --- | --- |
| Posterous | Verbatims mentioning Posterous, the blogging website |
| Power | Verbatims mentioning authoritativeness, forcefulness, and having the upper hand |
| Power Cord | Verbatims mentioning power cords |
| PreGame | Verbatims mentioning pre-game or post-game |
| Prepaid Cards | Verbatims mentioning prepaid credit cards |
| Prepared at home | Verbatims mentioning prepared at home |
| Previews | Previews component of the Promotions category related to teasers, demos and trailers |
| Price | Price component of the Pricing category related to prices, bills and fees and associated descriptors |
| Price Amounts | Verbatims mentioning specific prices |
| Price Increase | Price Increase component of the Pricing category related to price inflation and its measures and effects |
| Price Reduction | Price Reduction component of the Pricing category related to methods of discounting prices |
| Pricing | Pricing component of the 4P marketing mix including pricing, rollbacks, and clearances |
| Pride | Pride component of the basic human emotions related to feelings ranging from being proud to being shameful |
| Print Ads | Print Ads component of the Promotions category related to ads on billboards, signs and flyers |
| Printers | Verbatims mentioning computer printers |
| Privacy | Verbatims mentioning concealment, discreetness, and privacy |
| Processor | Verbatims mentioning computer processors |
| Product | Product component of the 4P marketing mix including its look, feel, style, quality, and customer service |
| Product Launch | Product Launch component of the Promotions category related to the release and launch of products |
| Product Safety | Safety component of the Product category related to a product's safety |
| Productivity | Verbatims mentioning productivity and efficiency |
| Profanity | Profanity component of Other category related to swear words and crude words |
| Professional | Professional component of the Professions category related to occupations like engineers, lawyers and teachers |
| Programming Language | Verbatims mentioning programming languages |
| Promotion | Verbatims mentioning commercials, public relations, and communications |
| Protests | Verbatims mentioning protests, strikes or boycotts |
| PS3 | Verbatims mentioning PS3 |
| Public Relations | Public Relations component of the Promotions category related to campaigns, exhibits and publicity stunts |
| Public Spaces | Verbatims mentioning public spaces such as parks, beaches, and nature areas |
| Punctuality | Verbatims mentioning punctuality ranging from being on time to being late |
| Purchasing | Purchasing component of Brand Benchmarks related to buying or purchasing |
| Quesadillas | Verbatims mentioning quesadillas |
| Race | Verbatims mentioning white people, black people, and other ethnicities |
| Racism | Racism component of the Personality category related to racial slurs and disrespectful words. NOTE: Higher top box and average scores mean happier, more positive feelings. |
| Radio Ads | Radio Ads component of the Promotions category related to advertisements on the radio |
| Radio Stations | Verbatims mentioning radio stations such as CHUM FM or WKRP |
| RAM | Verbatims mentioning computer RAM |
| Rap Artists | Verbatims mentioning rap artists like Jay-Z, Missy Elliot and Snoop Dogg |
| Reading Materials | Reading Materials component of Literature category related to types of reading materials |
| Reality Television Shows | Verbatims mentioning reality television shows like Wife Swap, the Amazing Race and the Hills |
| Rear-End | Verbatims mentioning the rear end of people |
| Recommend | Recommend component of Brand Benchmarks related to recommending or vouching for something |
| Records | Verbatims mentioning world records, Olympic records and similar |
| Refreshment | Verbatims mentioning refreshment or satisfaction |
| Reggae Artists | Verbatims mentioning reggae artists like Bob Marley, Alton Ellis and Peter Tosh |
| Region | Region component of the People Association category related to Verbatims mentioning rural, urban, towns, or regions |
| Religion | Religion component of the People Association category related to Verbatims mentioning religions, religious buildings or religious icons. Please be respectful. |

APPENDIX I-continued

List of Example Constructs

| name | description |
|---|---|
| Religious Observances | Verbatims mentioning religious observances including Easter, Eid al Fitr and Passover |
| Repairs | Repairs component of the Product category related to repairs and malfunctions. NOTE: Higher top box and average scores mean happier, more positive feelings. |
| Republican | Verbatims mentioning the Republican political orientation |
| Reputation | Verbatims mentioning reputations and image |
| Research Companies | Verbatims mentioning research companies such as Kantar, Forrester or NPD |
| Research&Development | Verbatims mentioning research and development endeavors |
| Resellers | Resellers component of the Placement category related to Verbatims mentioning general and specific secondary sales |
| Rest | Rest component of Health and Safety category relating to resting and needing rest |
| Restaurant | Verbatims mentioning restaurant |
| Retired NFL Players | Discussions on retired NFL players like Troy Aikman, Corey Miller and Larry Brown |
| RIA | Verbatims mentioning rich internet applications like Adobe Flash, Silverlight, and Adobe Air |
| Rock Artists | Verbatims mentioning rock artist like Nirvana, Coldplay and Oasis |
| Router | Verbatims mentioning routers |
| Sadness | Sadness component of the basic human emotions related to feelings of sadness, depression, or forlornness. NOTE: Higher top box and average scores mean happier, more positive feelings. |
| Salad | Verbatims mentioning salads |
| Salami | Verbatims mentioning salami |
| Sales | Sales component of the Professions category related to sales agents, brokers and cashiers |
| Salmon | Verbatims mentioning salmon |
| Salty | Verbatims mentioning salty |
| Sandwiches | Verbatims mentioning roast beef, club, turkey and other types of sandwiches and wraps |
| Sausage | Verbatims mentioning sausage |
| Savor | Savor component of the five human senses related to tasting and how things taste |
| Scanners | Verbatims mentioning computer scanners |
| Scent | Scent component of the five human senses related to how things smell |
| School Supplies | Verbatims mentioning school supplies such as binders, pencils, or backpacks |
| Schooling | Schooling component of the People Association category related to Verbatims mentioning school, tuition, or degrees |
| Scroll Pad | Verbatims mentioning the scroll pad |
| Seafood | Verbatims mentioning seafood |
| Seasons | Verbatims mentioning calendar seasons and life seasons including summer, winter, baseball and hunting seasons |
| Seatbelts | Verbatims related to seatbelts |
| Second Hand Items | Verbatims mentioning used items like phones, clothes and cameras |
| Self Checkout | Self Checkout Component of the Retailer Characteristics category related to customers being able to scan and pay without a cashier |
| Sensation | Sensation component of the five human senses related to how things feel in a physical sense such as sharp, hot, or smooth |
| Sensitive | Sensitive component of the Personal Beauty category related to Verbatims mentioning sensitivity or allergies |
| Server Operating Systems | Verbatims mentioning server OS like Windows Server, Mac OS Server and Open Enterprise |
| Service Charges | Verbatims mentioning fees and service charges or extra charges |
| Service&Aid | Service and Aid component of the Professions category occupations like child care workers, firefighters and nurse aides |
| Servicing | Servicing component of the Product category related to servicing of products and getting assistance |
| Sexuality | Verbatims mentioning heterosexuality, homosexuality, or transgenders. Please be respectful. |
| Sexy | Verbatims mentioning sexy ranging from being aroused to being turned off |
| Shampoo Brands | Verbatims mentioning brands of shampoo |
| Shape | Verbatims mentioning shapes such as circles, squares, and triangles |
| Shiny | Verbatims mentioning shine and sparkle |
| Shopping Cart | Verbatims mentioning shopping carts |
| Short | Verbatims mentioning being petite or short |
| Short Track | Verbatims mentioning the sport of short track speed skating |
| Shrimp | Verbatims mentioning shrimp |
| Sight | Sight component of the five human senses related to what someone sees with their eyes |
| Singing | Verbatims talking about singing |
| Skeleton | Verbatims mentioning the sport of skeleton |
| Ski jump | Verbatims mentioning the sport of ski jumping |

APPENDIX I-continued

List of Example Constructs

| name | description |
|---|---|
| Skin Care Brands | Verbatims mentioning brands of skin care products |
| Skin Treatments | Verbatims mentioning skin rejuvenation treatments |
| Slow | Verbatims mentioning being slow |
| Slurpee | Verbatims mentioning slurpees |
| Small | Verbatims mentioning things being tiny, puny, or scant |
| Small Business | Verbatims mentioning small businesses or home businesses |
| Smile | Verbatims mentioning smiles |
| Smoking | Smoking component of Health and Safety category relating to cigarettes and smoking |
| Snack | Snack component of Food and Beverage category related to Verbatims mentioning eating throughout the day but not including regular mealtimes |
| Snack Brands | Verbatims mentioning snack brands like Cheetos, Oreo and Ben and Jerry's |
| Snack Items | Verbatims mentioning snack items like candy, chips and nuts |
| Snow | Verbatims mentioning snow |
| Snow vehicles | Verbatims mentioning snow vehicles such as snowmobiles or snowcats |
| Snowboard | Verbatims mentioning the sport of snowboarding |
| Soccer Celebrities | Verbatims mentioning soccer celebrities like David Beckham, Michael Owen and Ryan Giggs |
| Sociability | Verbatims mentioning sociability ranging from extroversion to introversion |
| Social Functions | Verbatims mentioning social functions like fundraisers, conferences and exhibitions |
| Social Networks | Verbatims mentioning social networks such as Facebook or Myspace |
| Soda - 7-up | Verbatims mentioning 7-up |
| Soda - Cherry Cola | Verbatims mentioning cherry cola |
| Soda - Coke | Verbatims mentioning Coke |
| Soda - Cola | Verbatims mentioning colas such as Pepsi and Coke |
| Soda - Diet Coke | Verbatims mentioning Diet Coke |
| Soda - Diet Pepsi | Verbatims mentioning Diet Pepsi |
| Soda - Dr. Pepper | Verbatims mentioning Dr. Pepper |
| Soda - Lemon Lime | Verbatims mentioning lemon line sodas |
| Soda - Pepsi | Verbatims mentioning Pepsi and excluding Diet Pepsi |
| Soda - Root Beer | Verbatims mentioning root beer |
| Soda - Sprite | Verbatims mentioning sprite |
| Sony Reader | Verbatims mentioning Sony eReader |
| Sonystyle | Verbatims mentioning Sonystyle |
| Sound | Sound component of the five human senses related to sounds such as loud, clatter, or murmur |
| Sound Card | Verbatims mentioning computer sound cards |
| Soup | Verbatims mentioning soup |
| South America | South America component of the Global Association category related to Verbatims mentioning countries in South America |
| Space | Verbatims mentioning outer space |
| Spacious | Verbatims talking about spaciousness and roomy |
| Spaghetti | Verbatims mentioning Spaghetti |
| Spam | Spam component of the Business category related to dishonest email or internet practices. NOTE: Higher top box and average scores mean happier, more positive feelings. |
| Speakers | Verbatims mentioning speakers |
| Special Needs | Verbatims mentioning special needs and accessibility |
| Special Occasion | Verbatims mentioning special occasions |
| SpecialtyFood Shops | Specialty Food Restaurants component of the Placement category related to Verbatims mentioning general and specific specialty food shops |
| Speech | Verbatims mentioning jargon, enunciation, and language |
| Spitting | Verbatims talking about spitting |
| Sporting Associations | Verbatims mentioning sporting associations such as NCAA |
| Sporting Events | Verbatims mentioning sporting events such as Wimbledon |
| Sporting Good Stores | Sporting Good Stores component of the Placement category related to general and specific sporting goods stores |
| Sports | Verbatims mentioning individuals sports such as hockey, football, or golf |
| Sports Celebrities | Verbatims mentioning sports celebrities including Bob Gibson, Lance Armstrong and Jesse Owens |
| Sports Equipment | Verbatims mentioning sports equipment |
| Sports Goals | Verbatims mentioning goals, touchdowns and scores |
| Sports Television Shows | Verbatims mentioning sports television shows like The Ultimate Fighter, Monday Night Football and TNA Impact |
| Stadium Seats | Verbatims mentioning seats |
| Stadiums | Discussions relating to stadiums and arenas like the Staples Center, Olympic Stadium and Rogers Center |
| Steak | Verbatims mentioning Steak |
| Steamed | Verbatims mentioning steamed |
| Steering | Verbatims related to steering |

APPENDIX I-continued

List of Example Constructs

| name | description |
| --- | --- |
| Strawberry | Verbatims mentioning strawberry flavors |
| Strength of Taste | Verbatims mentioning strength of taste such as bland or bold |
| Studios | Verbatims mentioning entertainment studios |
| Stuffed Crust | Verbatims mentioning stuffed crust |
| Styling | Styling component of the Product category related to a product's style |
| Submarines | Verbatims mentioning submarine sandwiches |
| Sundaes | Verbatims mentioning Sundaes |
| Sundries | Everyday household needs such as pet food, laundry detergent, bathroom supplies, or kitchen supplies |
| Supper | Supper component of Food and Beverage category related to Verbatims mentioning eating in the evening |
| Surprise | Surprise component of the basic human emotions related to feelings of astonishment, surprise, or bewilderment |
| Sweepstakes | Verbatims mentioning sweepstakes and draws |
| Sweetener - Artificial | Verbatims mentioning artificial sweeteners |
| Sweetener - Natural | Verbatims mentioning natural sweeteners |
| Sweetness | Verbatims mentioning sweetness |
| Switching | Verbatims mentioning switching or changing from one thing to another |
| Tacos | Verbatims mentioning tacos, nachos and burritos |
| Take Out Food | Take Out Food component of Food and Beverage component related to obtaining fast food without eating at the restaurant |
| Talk Shows | Verbatims mentioning talk shows such as the Oprah show, or the Ellen show |
| Tall | Tall component of the Physical Descriptors category related to being high, lanky, or towering |
| Tater Tots | Verbatims mentioning tator tots |
| Tea - Bubble | Verbatims mentioning bubble tea |
| Tea - Ice | Verbatims mentioning ice tea |
| Tea - Sweet | Verbatims mentioning sweet tea |
| Teen | Teen component of the People Association category related to Verbatims mentioning adolescents, teenagers, and young people |
| Teeth | Verbatims mentioning teeth |
| Telephone Category | Verbatims mentioning telephones, cell phones, or smart phones |
| Television Brands | Verbatims mentioning television brands like Sony, Samsung and Panasonic. |
| Television Coverage | Verbatims talking about television coverage |
| Television Shows | Verbatims mentioning different kinds of TV shows |
| Televisions | Verbatims mentioning types and sizes of televisions |
| Tennis Celebrities | Verbatims mentioning tennis celebrities like Maria Sharapova, Andre Agassi and Serena Williams |
| Thin Crust | Verbatims mentioning thin crust |
| Ticketmaster | Verbatims mentioning Ticketmaster |
| Tickets | Verbatims mentioning Tickets |
| Tidy | Tidy component of the Physical Descriptors category related to clutter, neatness, and organization |
| Time | Verbatims mentioning time |
| Time with friends | Verbatims mentioning spending time with friends in a very casual sense |
| Toppings | Verbatims mentioning food toppings like ketchup, cheese and pickles |
| Tops | Tops component of the Attire category related to Verbatims mentioning shirts, jackets, and pullovers |
| Tornados | Verbatims mentioning tornados |
| Toronto | Verbatims mentioning cities in the GTA, such as Toronto, Markham, or Oshawa |
| Touchscreen | Verbatims mentioning touch screens |
| Toy Stores | Toy Stores component of the Placement category related to general and specific toy and game shops |
| Toys | Verbatims mentioning games, toys, and playthings such as bicycles and Pictionary, and not including electronic games |
| Trade | Trade component of the Professions category related to occupations such as carpenters, farmers and plumbers |
| Trademarks | Trademarks component of the Product category related to logos, taglines and brand identity |
| Transportation | Transportation component of the Professions category related to occupations such as drivers, pilots and motor operators |
| Travel | Verbatims mentioning walking, biking, driving, or taking public transportation |
| Trial | Verbatims mentioning trying or testing something |
| Tripod | Verbatims mentioning tripods |
| Truck | Verbatims mentioning jeeps, vans, pickups, or SUVs |
| Trunk Space | Verbatims talking about trunk space |
| Trust | Trust component of the basic human emotions related to feelings of approval, esteem, or belief |
| Truveo | Verbatims mentioning Truveo, the video sharing website |
| Tumblr | Verbatims mentioning Tumblr, the blogging website |
| Tuna | Verbatims mentioning tuna |
| Turf | Verbatims mentioning grass or turf |

APPENDIX I-continued

List of Example Constructs

| name | description |
| --- | --- |
| TV Ads | TV Ads component of the Promotion category related to advertisements on the television |
| TV Stations | Verbatims mentioning television channels |
| Tweeters | Verbatims mentioning specific Twitter accounts |
| TwitPic | Verbatims mentioning TwitPic |
| Twitter | Discussions mentioned Twitter |
| Typepad | Verbatims mentioning Typepad, the blogging website |
| Undergarments | Undergarments component of the Attire category related to Verbatims mentioning underwear, briefs, or lingerie |
| Underweight | Verbatims mentioning someone being underweight |
| Undesirables | Undesirables component of the People Association category related to people with negative stereotypes such as prostitutes or lowlifes |
| Unions | Verbatims mentioning unions |
| Universities | Universities component of People Associations related to specific universities |
| Upgrades | Upgrades component of the Product category related to improving and upgrading existing products |
| Upscale | Verbatims mentioning upscale |
| US Presidents and VPs | Verbatims mentioning US Presidents and Vice Presidents including Abraham Lincoln and Barack Obama |
| USB | Verbatims mentioning USP functions |
| Vacationing | Verbatims mentioning vacations, holidays, or road trips |
| Vaio | Verbatims mentioning Vaio |
| Value | Value component of Brand Benchmarks related to importance, relevance, or appraisal |
| Vanilla | Verbatims mentioning vanilla |
| Vegetables | Verbatims mentioning vegetables including broccoli, tomatoes, and beans |
| Vehicle | Verbatims mentioning cars, trucks, and other vehicles |
| Vehicle Parts | Verbatims mentioning automotive parts including camshafts, gear sticks, and transmissions |
| Vehicle Seats | Verbatims mentioning seats in vehicles |
| Vending Machines | Vending Machines component of the Placement category related to products and services sold via automated machines |
| Video Games | Verbatims mentioning specific video games, computer games, and electronic games |
| Video Sharing | Verbatims mentioning video sharing websites |
| Viewfinder | Verbatims mentioning viewfinders |
| Vimeo | Verbatims mentioning Vimeo, the video sharing website |
| Visual Impairment | Verbatims mentioning visual impairment |
| Volunteering | Verbatims mentioning volunteering or donating time for free |
| Waiting | Verbatims mentioning waiting for something |
| Walkman | Verbatims mentioning Handycam |
| WalmartVSOther | Discussions directly comparing Walmart and another store |
| Warranty | Warranty component of the Product category related to warranties, guarantees, returns and exchanges |
| Wastefulness | Wastefulness component of the Business category related to the waste or squandering of funds or products. NOTE: Higher top box and average scores mean happier, more positive feelings. |
| Water Creature | Water Creature component of Outdoors category related to animals that live mainly in water such as fish, lobsters, or platypuses |
| Water Vehicles | Verbatims mentioning boats and water vehicles |
| Watered Down | Verbatims mentioning drinks being watered down |
| Weather | Verbatims mentioning the weather including rain, snow and wind |
| Web Servers | Verbatims mentioning web servers like Windows IIS, Apache and Tomcat |
| Webcam | Verbatims mentioning webcams |
| Websites | Website component of the Retailer Characteristics category related to Verbatims mentioning websites |
| What | What component of The W's category including any verbatim that includes the word "What" |
| When | When component of The W's category including any verbatim that includes the word "When" |
| Where | Where component of The W's category including any verbatim that includes the word "Where" |
| Whipped Cream | Verbatims mentioning whipped cream |
| Who | Who component of The W's category including any verbatim that includes the word "Who" |
| Whopper | Verbatims mentioning Whoppers |
| Why | Why component of The W's category including any verbatim that includes the word "Why" |
| Wide | Verbatims mentioning being broad, vast or wide |
| Wifi | Verbatims mentioning wifi |
| Windshield | Verbatims related to windshields |
| Wine - Italian | Verbatims mentioning Italian wines |
| Wine Companies | Verbatims mentioning wine companies |

APPENDIX I-continued

List of Example Constructs

| name | description |
|---|---|
| Wine Types | Verbatims mentioning types of wine |
| Wins | Verbatims mentioning wins and losses |
| With Whom | Verbatims mentioning specific people |
| Wives and Girlfriends | Verbatims mentioning wives and girlfriends |
| WMCyrus | Verbatims mentioning Miley Cyrus |
| WMSustainability | Verbatims mentioning the word "sustainability" |
| WordPress | Discussions mentioning WordPress |
| Wrestling Celebrities | Verbatims mentioning wrestling celebrities like Shawn Michaels, Triple H and the Undertaker |
| Xperia | Verbatims mentioning Xperia |
| Year | Verbatims mentioning years like 1960, 1995 and 2020 |
| YouTube | Discussions mentioning YouTube |
| Zamboni | Verbatims mentioning ice cleaning machines such as the Zamboni or the Olympia |

What is claimed is:

1. A data processing system for providing targeted online marketing research comprising:
a sampling engine configured to perform stratified random sampling by stratifying an interne sampling frame;
a demographic boosting system, in communication with the sampling engine, configured to:
define target categories by selecting demographic variables for the interne sampling frame, wherein the demographic variables define a percentage of potential websites to be crawled that are associated with the demographic variables;
iteratively boost the demographic variables by assigning a weighted value to one or more of the demographic variables, and computing new target weights for each demographic variable by multiplying the average weighted value across all demographic variables by a default target weight assigned to the new target weight; and
tune the target categories by modifying searching parameters associated with potential Internet websites to be crawled, the modifiable search parameters comprising: a list of potential interne websites to be crawled, a default target percentage of sentiments to be crawled for each potential internet website, and a specified percentage of a demographic variable for each of the potential interne websites;
a search engine, in communication with the demographic boosting system, configured to use the interne sampling frame to search and crawl internet website sentiments that are responsive to the target categories defined by the demographic boosting system;
a construct engine, in communication with the search engine, configured to store the interne website sentiments into taxonomic units of data; and
a sentiment modeler configured to present the website sentiments to a user in a plurality of charts, at least one of the charts being updateable to present updated website sentiments obtained in response to the iterative boosting of the demographic variables.

2. The data processing system as in claim 1 wherein the demographic variable associated with each of the potential websites includes:
a male variable defining a percentage of the potential interne websites to be crawled that are associated with males;
a female variable defining a percentage of the potential interne websites to be crawled that are associated with females;
an age variable defining a percentage of the potential internet websites to be crawled that are associated with a specified age range;
an income variable defining a percentage of the potential internet websites to be crawled that are associated with users having a specified financial income range; and
an education variable defining a percentage of the potential interne websites to be crawled that are associated with users having a specified education level.

3. The data processing system as in claim 2 wherein the demographic boosting system further includes computer readable instructions for:
enabling a demographic variable to be boosted by modifying any of the following variables: the male variable, the female variable, the age variable, the income variable; and the education variable;
computing, for each demographic variable, an average percentage for the demographic variable across all of the potential interne websites; and computing, for each demographic variable, an average percentage for each of the potential interne websites.

4. The data processing system as in claim 3 wherein the demographic boosting system further includes computer readable instructions for boosting the demographic variables by assigning a weighted value to one or more of the demographic variables.

5. The data processing system as in claim 4 wherein if no boost is assigned to a demographic variable, assigning a weighted value of 100% to the demographic variable.

6. The data processing system as in claim 4 wherein the demographic boosting system further includes computer readable instructions for processing the demographic variable for each potential internet website by dividing the computed average demographic variable with the computed average percentage for the demographic variable across substantially all of the potential internet websites.

7. The data processing system as in claim 4 wherein the demographic boosting system further includes computer readable instructions for computing, for each potential internet website, an average weighted value across all of the demographic weights for the respective potential internet website.

8. The data processing system as in claim 1 wherein the new target weight reflects a percentage of sentiments to be pulled from each potential interne website.

9. The data processing system as in claim 1 wherein in determining internet website sentiments that are responsive to the target categories defined by the demographic boosting system, the search engine further including computer readable instructions for eliminating astro-turfing.

10. The data processing system as in claim 1 wherein the construct engine storing the sentiments into taxonomic units of data further includes computer readable instructions for:
   identifying a client's brand name;
   defining the taxonomic units based on a pattern detected in the exploratory search results;
   identifying keywords that are associated with each pattern;
   processing a second search to confirm the exploratory search results; and
   comparing the exploratory search results with the second search results.

11. The data processing system as in claim 1 wherein the taxonomic units of data are constructs providing average sentiment scores for sentiments using words relating to a product.

12. The data processing system as in claim 1 wherein the construct engine configured to store the sentiments into taxonomic units of data further includes computer readable instructions for scoring the sentiments based on a marketing mix of measures including price.

13. The data processing system as in claim 1 wherein the sampling engine configured to perform stratified random sampling further includes the sampling engine configured to create the internet sampling frame by crawling internet websites having a requisite level of internet traffic.

14. The data processing system as in claim 1 wherein the sampling engine configured to perform stratified random sampling further includes the sampling engine being configured to create the internet sampling frame using categorical stratified sampling including crawling internet websites having respective blogging content, respective microblogging content, respective image content, respective video content, respective social networking content, respective consumer ratings content, respective news content, and respective question and answer based content.

15. The data processing system as in claim 1 wherein the demographic boosting system, in communication with the sampling engine, defining target categories by selecting demographic variables for the internet sampling frame further includes selecting a matrix is based on demographics, verticals, and internet usage.

16. The data processing system as in claim 15 wherein the matrix is one of the following matrices:
   an extensive contributor's matrix targeting internet websites having content that is being constantly updated;
   an extensive reader matrix targeting internet websites having a high volume of readers, regardless of the amount of contributors to the internet reader website;
   a popular source matrix targeting internet websites having a high volume of registered and active users; and
   a time sensitive matrix targeting internet websites having recently updated content.

17. The data processing system as in claim 15 wherein the matrix is one of the following matrices:
   a financial matrix targeting internet websites having substantially high percentages of data about finances and money;
   a business matrix targeting internet websites having substantially high percentages of data about business topics;
   an apparel matrix targeting internet websites having substantially high percentages of data about clothing, shoes, and accessories; and
   an electronics matrix targeting internet websites having substantially high percentages of data about electronics including televisions and music players.

18. The data processing system as in claim 15 wherein the matrix is one of the following matrices:
   a sports matrix targeting internet websites having substantially high percentages of data about sporting goods and equipment;
   an entertainment matrix targeting internet websites having substantially high percentages of data about current entertainment topics including movies and music;
   a travel matrix targeting internet websites having substantially high percentages of data about traveling; and
   a food and beverage matrix targeting internet websites having substantially high percentages of data about food and beverages.

19. The data processing system as in claim 15 wherein the matrix is one of the following matrices:
   a restaurant matrix targeting internet websites having substantially high percentages of data about restaurants;
   a medical matrix targeting internet websites having substantially high percentages of medical information;
   a beauty matrix targeting internet websites having substantially high percentages of information about all types of beauty products; and
   an automotive matrix targeting internet websites having substantially high percentages of information about vehicles.

20. The data processing system as in claim 15 wherein the matrix is one of the following matrices:
   a home care matrix targeting internet websites having substantially high percentages of information about home care products;
   a baby information matrix targeting internet websites having substantially high percentages of information about infants and toddlers aged 0 to 4;
   a children information matrix targeting internet websites having substantially high percentages of information about children who are aged 5 to 12;
   a teen contributors matrix targeting internet websites having substantially high percentages of users and readers who are aged 13 to 17; and
   a teen information matrix targeting internet websites having substantially high percentages of data about people who are aged 13 to 17.

21. The data processing system as in claim 15 wherein the matrix is one of the following matrices:
   an adult matrix targeting internet websites having substantially high percentages of users and readers who are aged 18 and older;
   a male matrix targeting internet websites having substantially high percentages of users and readers who are male; and
   a female matrix targeting internet websites having substantially high percentages of users and readers who are female.

22. The data processing system as in claim 15 wherein the matrix is one of the following matrices:
   an affluent matrix targeting interne websites having substantially high percentages of users and readers who have incomes of $75,000 or more per year;
   a low income matrix targeting internet websites having substantially high percentages of users and readers who have incomes less than $75,000 per year;
   a scholars matrix targeting internet websites having substantially high percentages of users and readers who have at least a college degree; and
   a low education matrix targeting internet websites having substantially high percentages of users and readers who do not have a college degree.

23. The data processing system as in claim 1 wherein selecting a matrix further includes defining a custom matrix by enabling the user to select a user defined website or user defined categories of websites.

24. A method for providing targeted online marketing research, the method comprising:
   using a sampling engine to perform stratified random sampling on an internet sampling frame;
   using a demographic boosting system, in communication with the sampling engine, to:
      define target categories by selecting demographic variables for the internet sampling frame, wherein the demographic variables define a percentage of potential websites to be crawled that are associated with the demographic variables;
      iteratively boost the demographic variables by assigning a weighted value to one or more of the demographic variables, and computing new target weights for each demographic variable by multiplying the average weighted value across all demographic variables by a default target weight assigned to the new target weight; and
      tune the target categories by modifying searching parameters associated with potential internet websites to be crawled, the modifiable search parameters comprising: a list of potential internet websites to be crawled, a default target percentage of sentiments to be crawled for each potential internet website, and a specified percentage of a demographic variable for each of the potential internet websites;
   using a search engine, in communication with the demographic boosting system, to search and crawl internet website sentiments that are responsive to the target categories defined by the demographic boosting system;
   using a construct engine, in communication with the search engine, to store the internet website sentiments into taxonomic units of data; and
   using a sentiment modeler to present the website sentiments to a user in a plurality of charts, at least one of the charts being updateable to present updated website sentiments obtained in response to the iterative boosting of the demographic variables.

25. The method of claim 24 wherein the demographic variable associated with each of the potential websites includes:
   a male variable defining a percentage of the potential internet websites to be crawled that are associated with males;
   a female variable defining a percentage of the potential internet websites to be crawled that are associated with females;
   an age variable defining a percentage of the potential internet websites to be crawled that are associated with a specified age range;
   an income variable defining a percentage of the potential internet websites to be crawled that are associated with users having a specified financial income range; and
   an education variable defining a percentage of the potential internet websites to be crawled that are associated with users having a specified education level.

26. The method of claim 25 wherein the demographic boosting system is further used to:
   enable a demographic variable to be boosted by modifying any of the following variables: the male variable, the female variable, the age variable, the income variable; and the education variable;
   compute, for each demographic variable, an average percentage for the demographic variable across all of the potential internet websites; and
   compute, for each demographic variable, an average percentage for each of the potential internet websites.

27. The method of claim 26 wherein the demographic boosting system is further used to: boost the demographic variables by assigning a weighted value to one or more of the demographic variables.

28. The method of claim 27 further comprising:
   assigning a weighted value of 100% to the demographic variable if no boost is assigned to a demographic variable.

29. The method of claim 27 wherein the demographic boosting system is further used to:
   process the demographic variable for each potential internet website by dividing the computed average demographic variable with the computed average percentage for the demographic variable across substantially all of the potential internet websites.

30. The method of claim 27 wherein the demographic boosting wherein the demographic boosting system is further used to:
   compute, for each potential internet website, an average weighted value across all of the demographic weights for the respective potential internet website.

31. The method of claim 24 wherein the new target weight reflects a percentage of sentiments to be pulled from each potential internet website.

32. The method of claim 24 wherein in determining internet website sentiments that are responsive to the target categories defined by the demographic boosting system, the search engine is further used to eliminate astro-turfing.

33. The method of claim 24 wherein the construct engine storing the sentiments into taxonomic units of data is further used to:
   identify a client's brand name;
   define the taxonomic units based on a pattern detected in the exploratory search results;
   identify keywords that are associated with each pattern;
   process a second search to confirm the exploratory search results; and
   compare the exploratory search results with the second search results.

34. The method of claim 24 wherein the taxonomic units of data are constructs providing average sentiment scores for sentiments using words relating to a product.

35. The method of claim 24 wherein the construct engine configured to store the sentiments into taxonomic units of is further used to score the sentiments based on a marketing mix of measures including price.

36. The method of claim 24 wherein the sampling engine configured to perform stratified random sampling is further used to create the interne sampling frame by crawling internet websites having a requisite level of internet traffic.

37. The method of claim 24 wherein the sampling engine is further used to:
   create the internet sampling frame using categorical stratified sampling, including crawling internet websites having respective blogging content, respective microblogging content, respective image content, respective video content, respective social networking content, respective consumer ratings content, respective news content, and respective question and answer based content.

38. The method of claim 24 wherein the demographic boosting system defines target categories by selecting demographic variables for the internet sampling frame by selecting a matrix based on demographics, verticals, and internet usage.

39. The method of claim 24 wherein selecting a matrix further includes defining a custom matrix by enabling the user to select a user defined website or user defined categories of websites.

40. A computer program product for providing targeted online marketing research, comprising:
a non-transitory computer-readable medium having program code recorded thereon, the program code comprising code to:
perform stratified random sampling on an interne sampling frame;
define target categories by selecting demographic variables for the interne sampling frame, wherein the demographic variables define a percentage of potential websites to be crawled that are associated with the demographic variables;
iteratively boost the demographic variables by assigning a weighted value to one or more of the demographic variables, and computing new target weights for each demographic variable by multiplying the average weighted value across all demographic variables by a default target weight assigned to the new target weight; and
tune the target categories by modifying searching parameters associated with potential internet websites to be crawled, the modifiable search parameters comprising: a list of potential internet websites to be crawled, a default target percentage of sentiments to be crawled for each potential internet website, and a specified percentage of a demographic variable for each of the potential internet websites;
search and crawl internet website sentiments that are responsive to the target categories defined by the demographic boosting system;
store the internet website sentiments into taxonomic units of data; and
present the website sentiments to a user in a plurality of charts, at least one of the charts being updateable to present updated website sentiments obtained in response to the iterative boosting of the demographic variables.

41. The computer program product of claim 40 further comprising program code to:
define a percentage of the potential internet websites to be crawled that are associated with males;
define a percentage of the potential internet websites to be crawled that are associated with females;
define a percentage of the potential internet websites to be crawled that are associated with a specified age range;
define a percentage of the potential internet websites to be crawled that are associated with users having a specified financial income range; and
define a percentage of the potential internet websites to be crawled that are associated with users having a specified education level.

42. The computer program product of claim 41 further comprising program code to:
enable a demographic variable to be boosted by modifying any of the following variables: the male variable, the female variable, the age variable, the income variable; and the education variable;
compute, for each demographic variable, an average percentage for the demographic variable across all of the potential internet websites; and
compute, for each demographic variable, an average percentage for each of the potential internet websites.

43. The computer program product of claim 42 further comprising program code to:
boost the demographic variables by assigning a weighted value to one or more of the demographic variables.

44. The computer program product of claim 43 further comprising program code to:
assign a weighted value of 100% to the demographic variable if no boost is assigned to a demographic variable.

45. The computer program product of claim 43 further comprising program code to:
process the demographic variable for each potential internet website by dividing the computed average demographic variable with the computed average percentage for the demographic variable across substantially all of the potential internet websites.

46. The computer program product of claim 43 further comprising program code to:
compute, for each potential internet website, an average weighted value across all of the demographic weights for the respective potential internet website.

47. The computer program product of claim 40 further comprising program code to: compute a percentage of sentiments to be pulled from each potential internet website.

48. The computer program product of claim 40 further comprising program code to:
determine internet website sentiments that are responsive to the target categories defined by a demographic boosting system.

49. The computer program product of claim 40 further comprising program code to:
identify a client's brand name;
define the taxonomic units based on a pattern detected in the exploratory search results;
identify keywords that are associated with each pattern;
process a second search to confirm the exploratory search results; and
compare the exploratory search results with the second search results.

50. The computer program product of claim 40 further comprising program code to:
provide average sentiment scores for sentiments using words relating to a product.

51. The computer program product of claim 40 further comprising program code to:
score the sentiments based on a marketing mix of measures including price.

52. The computer program product of claim 40 further comprising program code to:
create an internet sampling frame by crawling internet websites having a requisite level of internet traffic.

53. The computer program product of claim 40 further comprising program code to:
create an internet sampling frame using categorical stratified sampling, including crawling internet websites having respective blogging content, respective microblogging content, respective image content, respective video content, respective social networking content, respective consumer ratings content, respective news content, and respective question and answer based content.

54. The computer program product of claim 40 further comprising program code to: define target categories by selecting demographic variables for an internet sampling frame by selecting a matrix based on demographics, verticals, and internet usage.

55. The computer program product of claim 40 further comprising program code to: define a custom matrix by enabling a user to select a user defined website or user defined categories of websites.

\* \* \* \* \*

UNITED STATES PATENT AND TRADEMARK OFFICE
CERTIFICATE OF CORRECTION

PATENT NO.        : 8,694,357 B2
APPLICATION NO.   : 12/802445
DATED             : April 8, 2014
INVENTOR(S)       : Tessie C. Ting et al.

Page 1 of 1

It is certified that error appears in the above-identified patent and that said Letters Patent is hereby corrected as shown below:

In the Specification
Column 1, line 26, delete "incentive's" and replace with --incentives--.
Column 7, line 11, delete "110" and replace with --I/O--.
Column 8, line 2, delete "Conversation" and replace with --Conversition--.
Column 9, line 4, delete "Apple" and replace with --Appel--.
Column 12, line 27, delete "interne" and replace with --internet--.

In the Claims
Column 53, claim 1, line 23, delete "interne" and replace with --internet--.
Column 53, claim 1, line 27, delete "interne" and replace with --internet--.
Column 53, claim 1, line 39, delete "Internet" and replace with --internet--.
Column 53, claim 1, line 41, delete "interne" and replace with --internet--.
Column 53, claim 1, line 45, delete "interne" and replace with --internet--.
Column 53, claim 1, line 47, delete "interne" and replace with --internet--.
Column 53, claim 1, line 52, delete "interne" and replace with --internet--.
Column 53, claim 2, line 63, delete "interne" and replace with --internet--.
Column 53, claim 2, line 66, delete "interne" and replace with --internet--.
Column 54, claim 2, line 27, delete "interne" and replace with --internet--.
Column 54, claim 3, line 38, delete "interne" and replace with --internet--.
Column 54, claim 3, line 41, delete "interne" and replace with --internet--.
Column 54, claim 8, line 64, delete "interne" and replace with --internet--.
Column 56, claim 22, line 56, delete "interne" and replace with --internet--.
Column 58, claim 36, line 55, delete "interne" and replace with --internet--.
Column 59, claim 40, line 13, delete "interne" and replace with --internet--.
Column 59, claim 40, line 16, delete "interne" and replace with --internet--.

Signed and Sealed this
First Day of July, 2014

Michelle K. Lee
*Deputy Director of the United States Patent and Trademark Office*